United States Patent
Flake, Jr. et al.

(10) Patent No.: US 9,814,229 B1
(45) Date of Patent: Nov. 14, 2017

(54) SWIMMING DECOY ASSEMBLIES, SYSTEMS AND METHODS

(71) Applicants: Ernest B. Flake, Jr., Shreveport, LA (US); Larry L. Flake, Bossier City, LA (US)

(72) Inventors: Ernest B. Flake, Jr., Shreveport, LA (US); Larry L. Flake, Bossier City, LA (US)

( * ) Notice: Subject to any disclaimer, the term of this patent is extended or adjusted under 35 U.S.C. 154(b) by 106 days.

(21) Appl. No.: 14/875,190

(22) Filed: Oct. 5, 2015

Related U.S. Application Data

(60) Provisional application No. 62/060,086, filed on Oct. 6, 2014.

(51) Int. Cl.
*A01M 31/06* (2006.01)

(52) U.S. Cl.
CPC .................................. *A01M 31/06* (2013.01)

(58) Field of Classification Search
CPC ....... A01M 29/06; A01M 31/00; A01M 31/06
USPC .................. 43/1, 2, 3; 114/294; D22/125
See application file for complete search history.

(56) References Cited

U.S. PATENT DOCUMENTS

| | | |
|---|---|---|
| 217,483 A | 7/1879 | Redmond |
| 1,376,282 A | 4/1921 | Kauffman |
| 2,457,295 A | 12/1948 | Woodhead |
| 2,457,286 A | 4/1951 | Sabin |
| 2,624,144 A * | 1/1953 | Beverman ............. A01M 31/06 43/3 |
| 2,674,065 A | 4/1954 | Sprinkle |
| 2,726,469 A * | 12/1955 | Becker .................. A01M 31/06 43/3 |
| 2,909,859 A | 10/1959 | Christmas |
| 3,034,245 A | 5/1962 | Lynch |
| 4,056,890 A | 11/1977 | Dembski |
| 4,422,257 A | 12/1983 | McCrory |
| 4,535,560 A | 8/1985 | O'Neil |
| 4,599,819 A * | 7/1986 | Voges, Jr. ............. A01M 31/06 43/2 |
| 4,660,313 A | 4/1987 | Bauernfeind et al. |
| 4,890,408 A * | 1/1990 | Heiges .................. A01M 31/06 43/3 |
| 4,910,905 A | 3/1990 | Girdley et al. |
| 5,074,071 A | 12/1991 | Dunne |
| 5,168,650 A * | 12/1992 | Martin .................. A01M 31/06 43/2 |
| 5,899,014 A * | 5/1999 | Bornhoft ............... A01M 31/06 43/3 |
| 5,974,720 A | 11/1999 | Bowling |
| 6,079,140 A | 6/2000 | Brock, IV |
| 6,088,944 A | 7/2000 | Jones |
| 6,138,396 A * | 10/2000 | Capps ................... A01M 31/06 43/3 |
| 6,357,161 B1 | 3/2002 | Best |
| 6,374,529 B1 | 4/2002 | Petroski et al. |
| 6,834,458 B1 | 12/2004 | Hand, III et al. |
| 6,957,509 B2 | 10/2005 | Wright |
| 7,043,865 B1* | 5/2006 | Crowe .................. A01M 31/06 43/3 |

(Continued)

*Primary Examiner* — Darren W Ark
*Assistant Examiner* — Brady W Frazier
(74) *Attorney, Agent, or Firm* — R. Keith Harrison

(57) ABSTRACT

Swimming decoy assemblies include a motor, at least one decoy actuating arm drivingly engaged for rotation by the motor and at least one decoy attached to the decoy actuating arm. Swimming decoy systems are also disclosed.

15 Claims, 23 Drawing Sheets

(56) References Cited

U.S. PATENT DOCUMENTS

| | | | |
|---|---|---|---|
| 7,137,221 B2 | 11/2006 | Highby et al. | |
| 7,434,347 B1 | 10/2008 | Powell | |
| 7,788,840 B2 | 9/2010 | Wyant et al. | |
| 8,256,155 B1 | 9/2012 | Goodwill et al. | |
| 2003/0061755 A1* | 4/2003 | McGhghy | A01M 31/06 43/3 |
| 2007/0266614 A1* | 11/2007 | Cagle | A01M 31/06 43/3 |
| 2009/0235571 A1 | 9/2009 | Wyant et al. | |
| 2012/0073181 A1* | 3/2012 | Loidolt | A01M 31/06 43/3 |
| 2013/0014422 A1* | 1/2013 | Bullerdick | A01M 31/06 43/3 |
| 2014/0245652 A1* | 9/2014 | Franklin | A01M 31/06 43/2 |
| 2014/0338248 A1* | 11/2014 | Leventini | A01M 31/06 43/2 |

\* cited by examiner

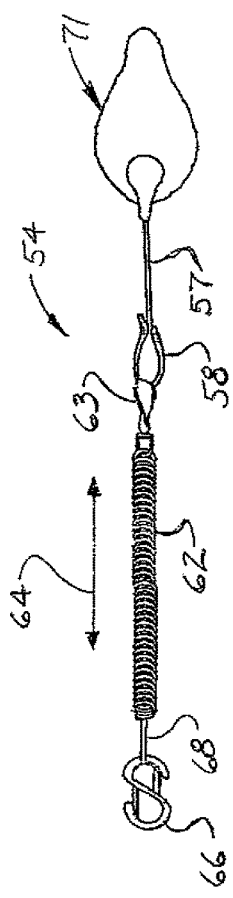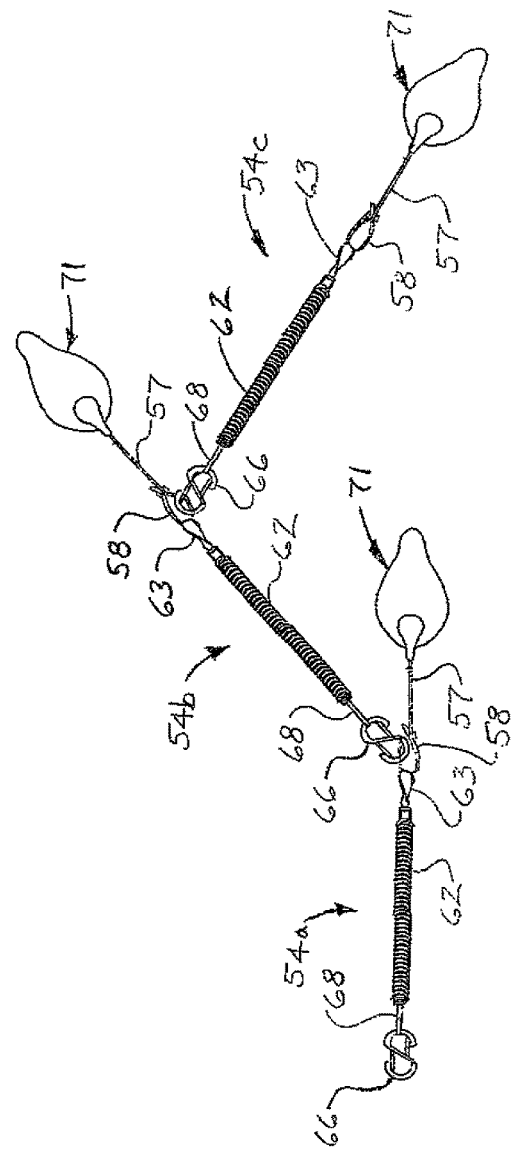

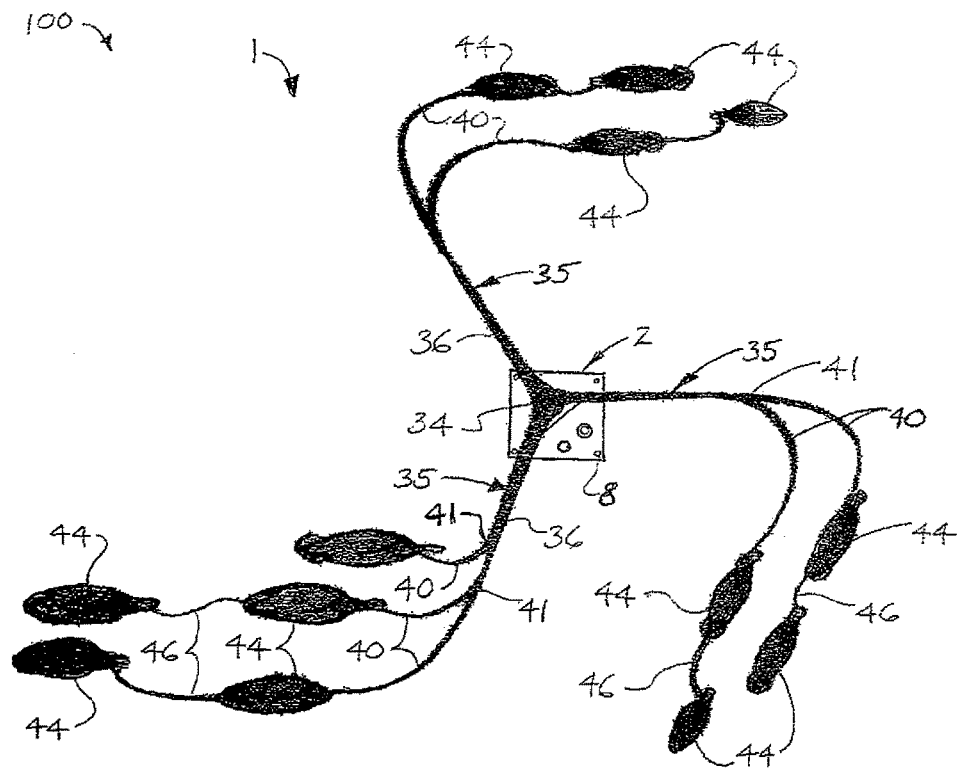
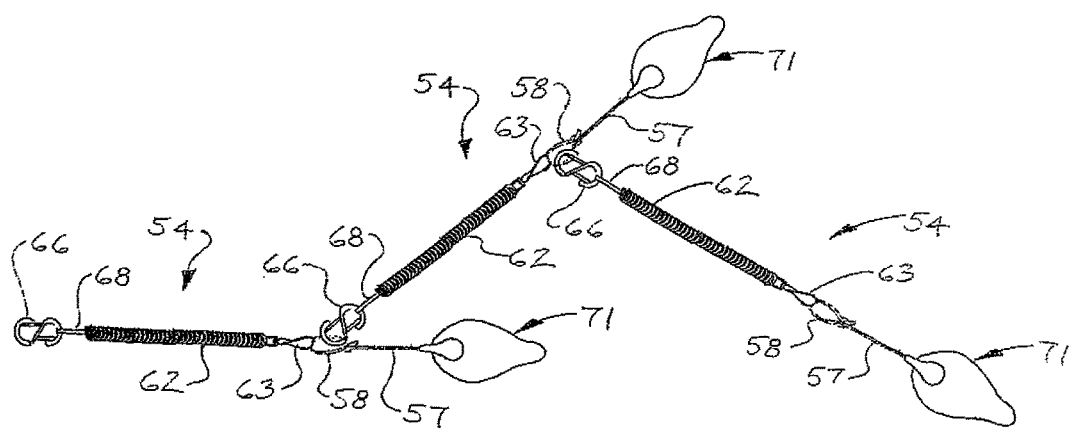
FIG. 10

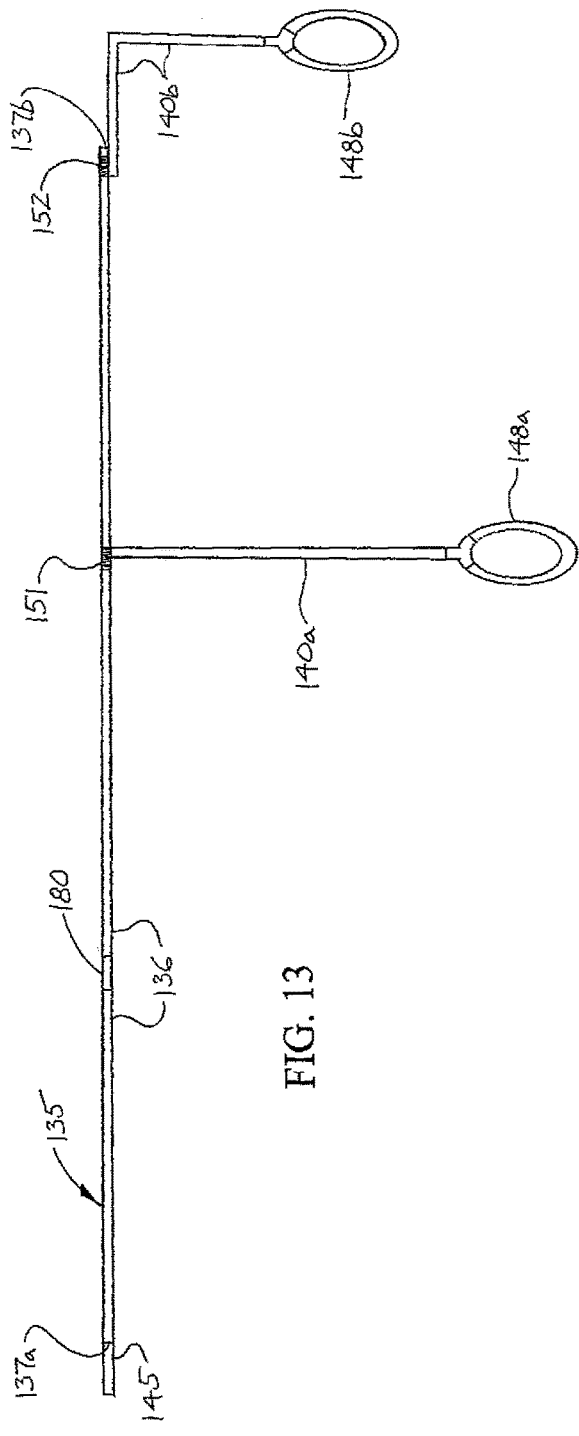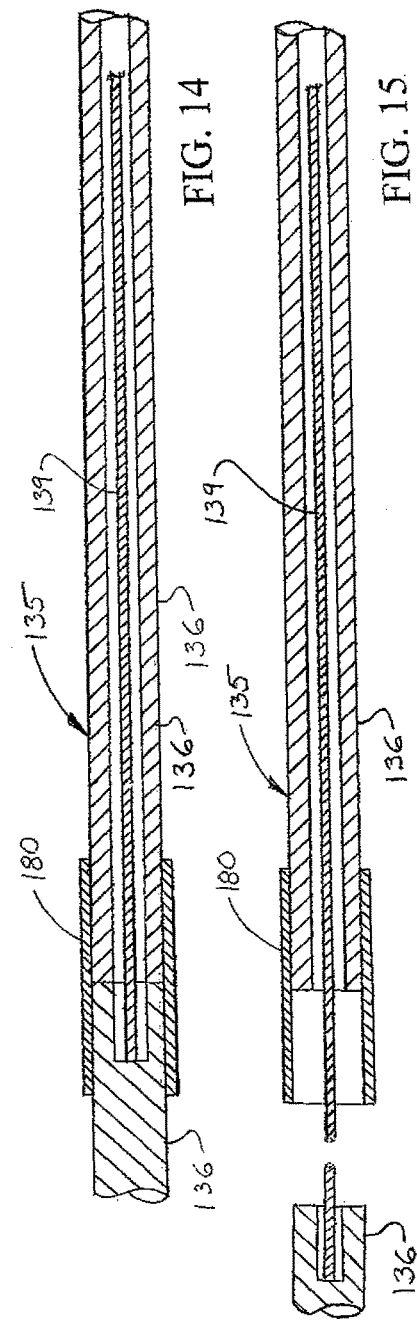

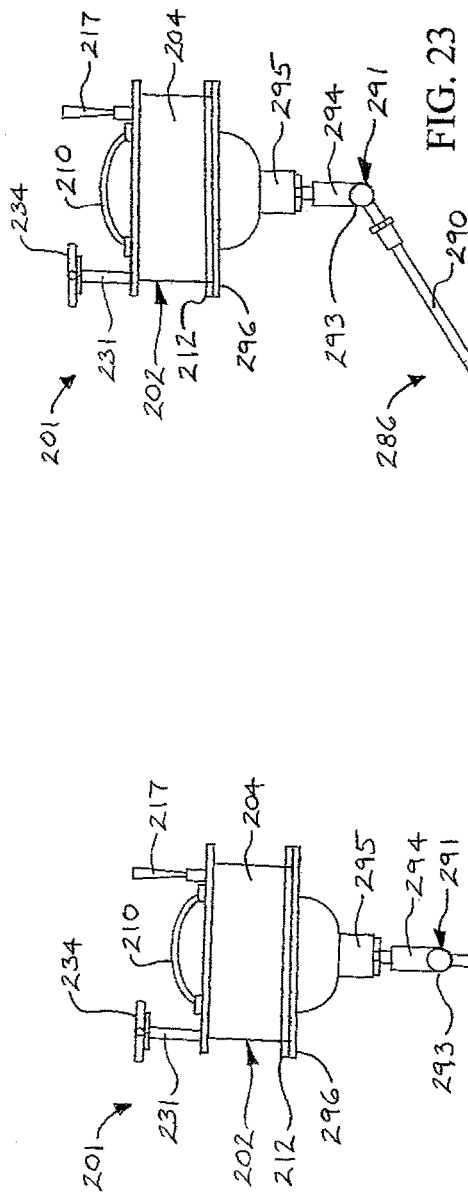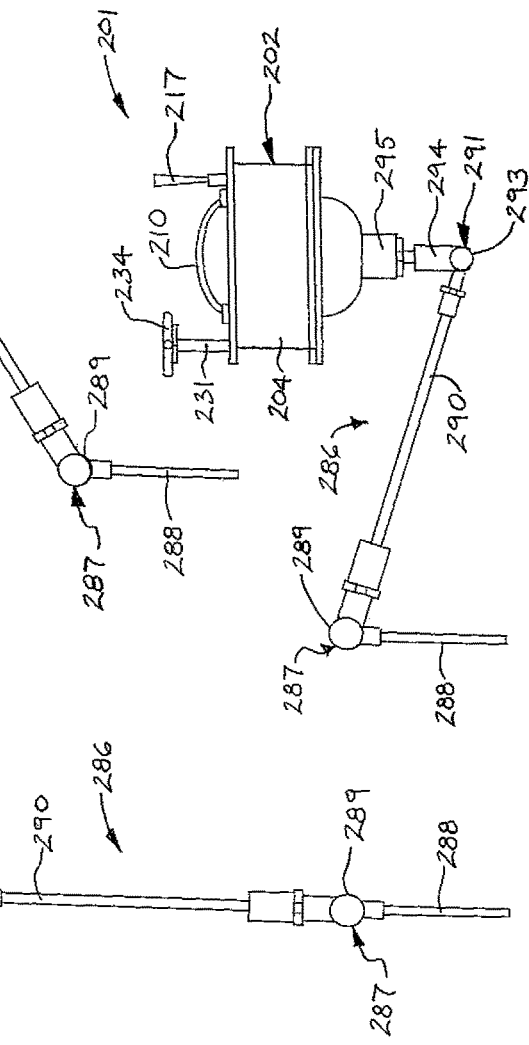

US 9,814,229 B1

SWIMMING DECOY ASSEMBLIES, SYSTEMS AND METHODS

CROSS-REFERENCE TO RELATED APPLICATIONS

This application claims the benefit of U.S. provisional application No. 62/060,086, filed Oct. 6, 2014 and entitled SWIMMING DECOY ASSEMBLIES, SYSTEMS AND METHODS, which provisional application is hereby incorporated by reference herein in its entirety.

FIELD

Illustrative embodiments of the disclosure generally relate to decoys for attracting wild game such as fowl. More particularly, illustrative embodiments of the disclosure relate to swimming decoy assemblies, systems and methods which simulate lifelike swimming patterns of fowl for the purpose of attracting fowl in hunting, observation or other applications.

BACKGROUND

The background description provided herein is solely for the purpose of generally presenting the context of the illustrative embodiments of the disclosure. Aspects of the background description are neither expressly nor impliedly admitted as prior art against the claimed subject matter.

Fowl decoys are artificially sized, shaped and colored to resemble water fowl such as ducks, geese or swine, for example. The decoys are typically placed on a body of water such as a lake or pond to attract water fowl for the purpose of hunting or observation. The decoys may be tethered to a stump or other support or may be weighted to prevent the decoys from drifting away from the hunting or observation area.

Considerable effort is often expended on rendering a fowl decoy as authentic and lifelike as possible. These efforts may include imparting movement to the decoy on the surface of the water. However, the manner in which the decoy is moved on the surface of the water body may not accurately simulate the actual motions of a water fowl swimming on the surface of the water. This limitation may hinder attraction of water fowl to the area in which the decoy moves on the water.

Accordingly, swimming decoy assemblies, systems and methods which simulate lifelike swimming patterns of fowl for the purpose of attracting fowl in hunting, observation or other applications are needed.

SUMMARY

Illustrative embodiments of the disclosure are generally directed to swimming decoy assemblies, systems and methods which simulate lifelike swimming patterns of fowl for the purpose of attracting fowl in hunting, observation or other applications. An illustrative embodiment of the swimming decoy assembly may include a height-adjustable pedestal assembly; an assembly housing carried by the pedestal assembly; a motor in the assembly housing; at least one decoy actuating arm drivingly engaged by the motor; at least two arm branches extending from the at least one decoy actuating arm; and at least two fowl decoys attached to the at least two arm branches, respectively.

An illustrative embodiment of the swimming decoy systems may include at least one swimming decoy assembly and at least one tether line decoy assembly in proximity to the at least one swimming decoy assembly. The swimming decoy system may further include a weighted decoy assembly in proximity to the at least one swimming decoy assembly and the at least one tether line decoy assembly.

Another illustrative embodiment of the swimming decoy assemblies may include a motor; at least one decoy actuating arm drivingly engaged by the motor, the at least one decoy actuating arm including a flexible or bendable primary arm segment having a primary arm branch point and a pair of flexible or bendable primary arm branches extending from the primary arm branch point; and at least one fowl decoy attached to each of the pair of primary arm branches of the at least one decoy actuating arm.

BRIEF DESCRIPTION OF THE DRAWINGS

Illustrative embodiments of the disclosure will now be described, by way of example, with reference to the accompanying drawings, in which:

FIG. 8 is a top view of the tether line decoy assembly, more particularly illustrating linear actuation of a fowl decoy in typical application of the assembly;

FIG. 9 is a top view of multiple tether line decoy assemblies attached to each other in a typical alternative application of the tether line decoy assemblies;

FIG. 10 is a top view of a swimming decoy system which includes top views of the illustrative swimming decoy assembly illustrated in FIG. 1 and the illustrative tether line decoy assemblies illustrated in FIG. 9 in typical application of the system;

FIG. 13 is a top view of a typical decoy actuating arm of the swimming decoy assembly illustrated in FIG. 12;

FIG. 14 is a longitudinal sectional view of a portion of the decoy actuating arm with a pair of adjacent arm segments in a connected configuration;

FIG. 15 longitudinal sectional view of a portion of the decoy actuating arm with the adjacent arm segments of the decoy actuating arm in a disconnected configuration;

FIGS. 22-24 are side views of the assembly housing and pedestal assembly illustrated in FIG. 21, more particularly illustrating various positions of the pedestal assembly to support the assembly housing in various depths of water;

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable users skilled in the art to practice the disclosure and are not intended to limit the scope of the claims. Moreover, the illustrative embodiments described herein are not exhaustive and embodiments or implementations other than those which are described herein and which fall within the scope of the appended claims are possible. Furthermore, there is no intention to be bound by any expressed or implied theory presented in the preceding technical field, background, brief summary or the following detailed description.

Figure 2:
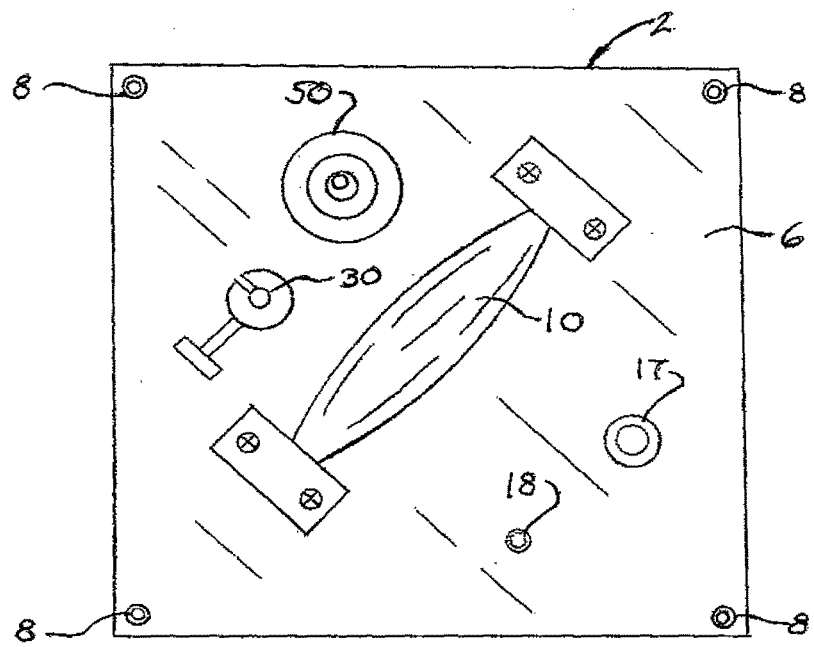
FIG. 2 is a top view of a typical assembly housing of the swimming decoy assembly.
Figure 3:
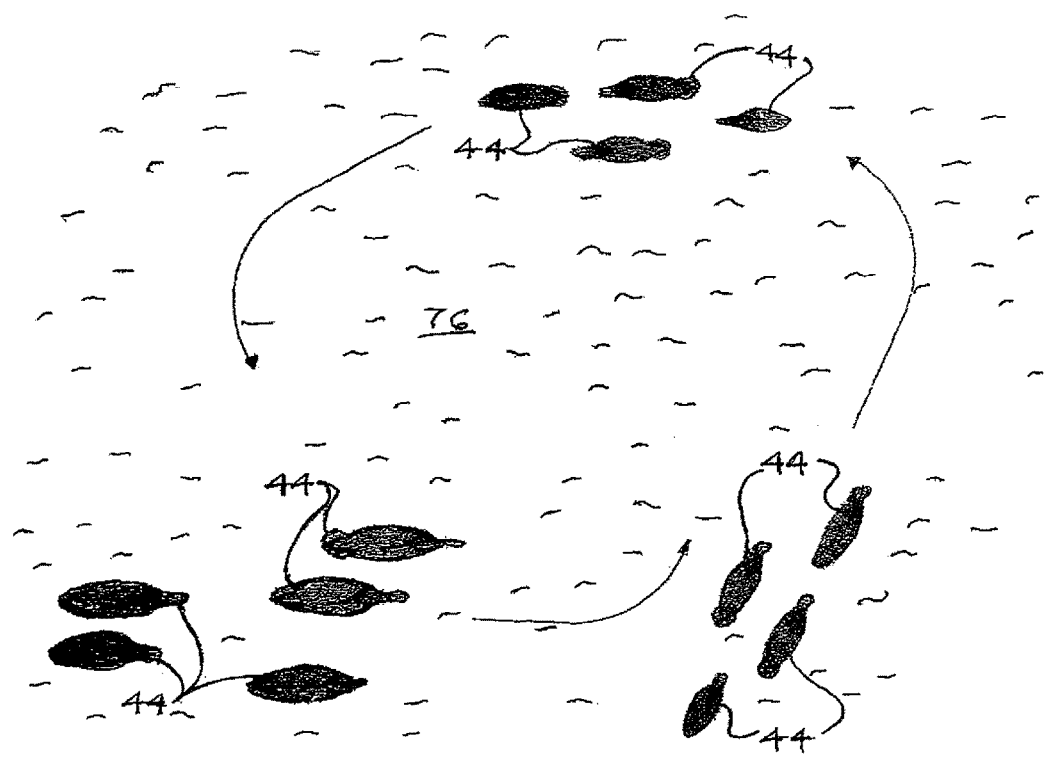
FIG. 3 is a top view of a body of water in typical application of the swimming decoy assembly, submerged beneath the surface of the water body.
Figure 4:
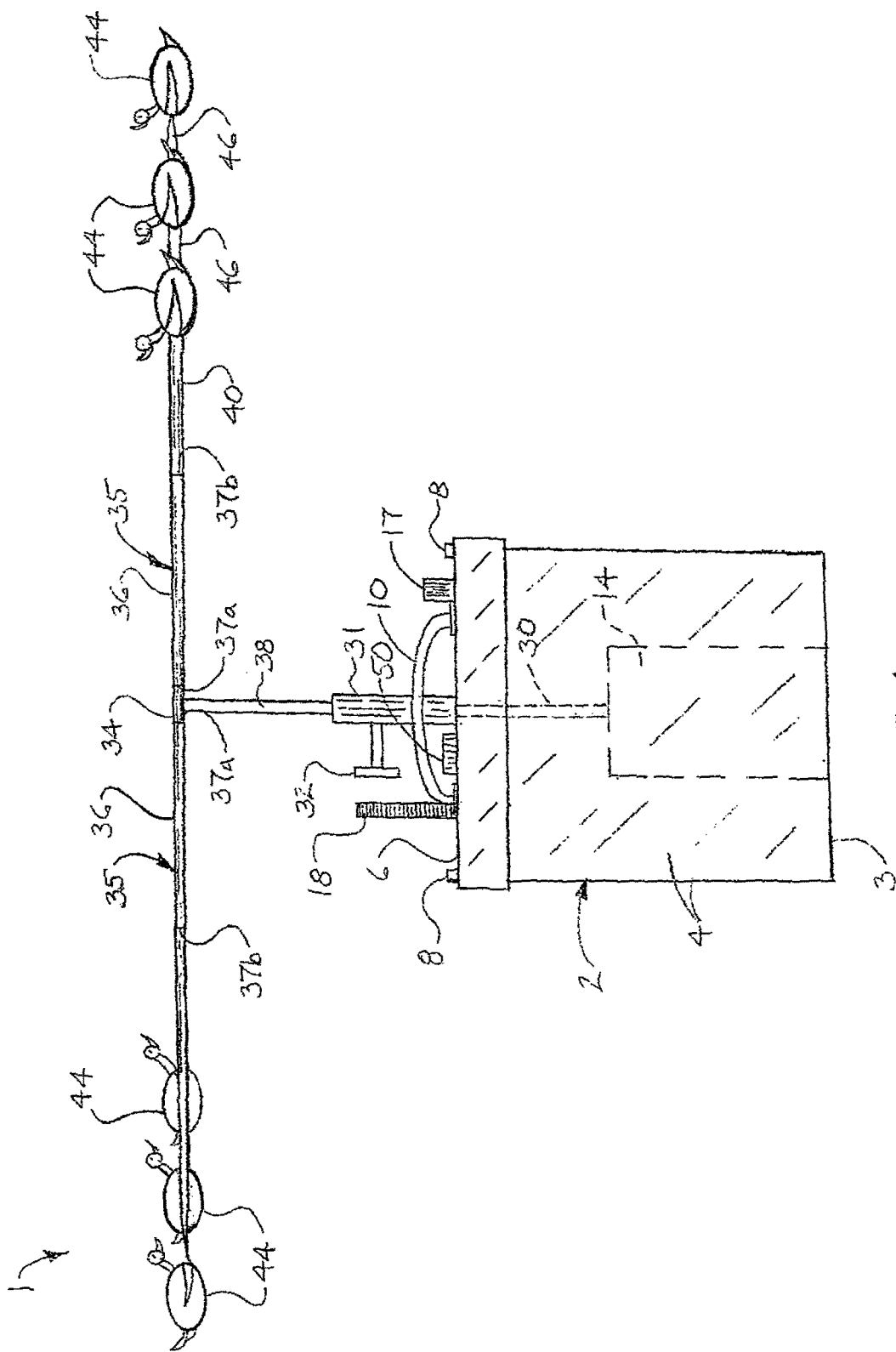
FIG. 4 is a side view of a typical swimming decoy assembly.

Referring initially to FIGS. 1-5 of the drawings, an illustrative embodiment of the swimming decoy assemblies, hereinafter assembly, is generally indicated by reference numeral 1. As illustrated in FIGS. 1, 2, 4 and 5, the assembly 1 may include an assembly housing 2. The assembly housing 2 may have a watertight construction and, as illustrated in FIG. 4, may include an assembly housing bottom 3; multiple assembly housing walls 4 upward-standing from the assembly housing bottom 3; and an assembly housing lid 6 fitted on the assembly housing walls 4. Lid fasteners 8 may detachably attach the assembly housing lid 6 to the assembly housing walls 4. A gasket or other sealing material or device (not illustrated) may be provided between the assembly housing walls 4 and the assembly housing lid 6 to impart a watertight seal between the interior and exterior of the assembly housing 2. A handle 10 may be provided on the assembly housing lid 6 for carrying purposes. A carrying strap (not illustrated) may additionally or alternatively be attached to the assembly housing 2 for carrying purposes.

Figure 5:
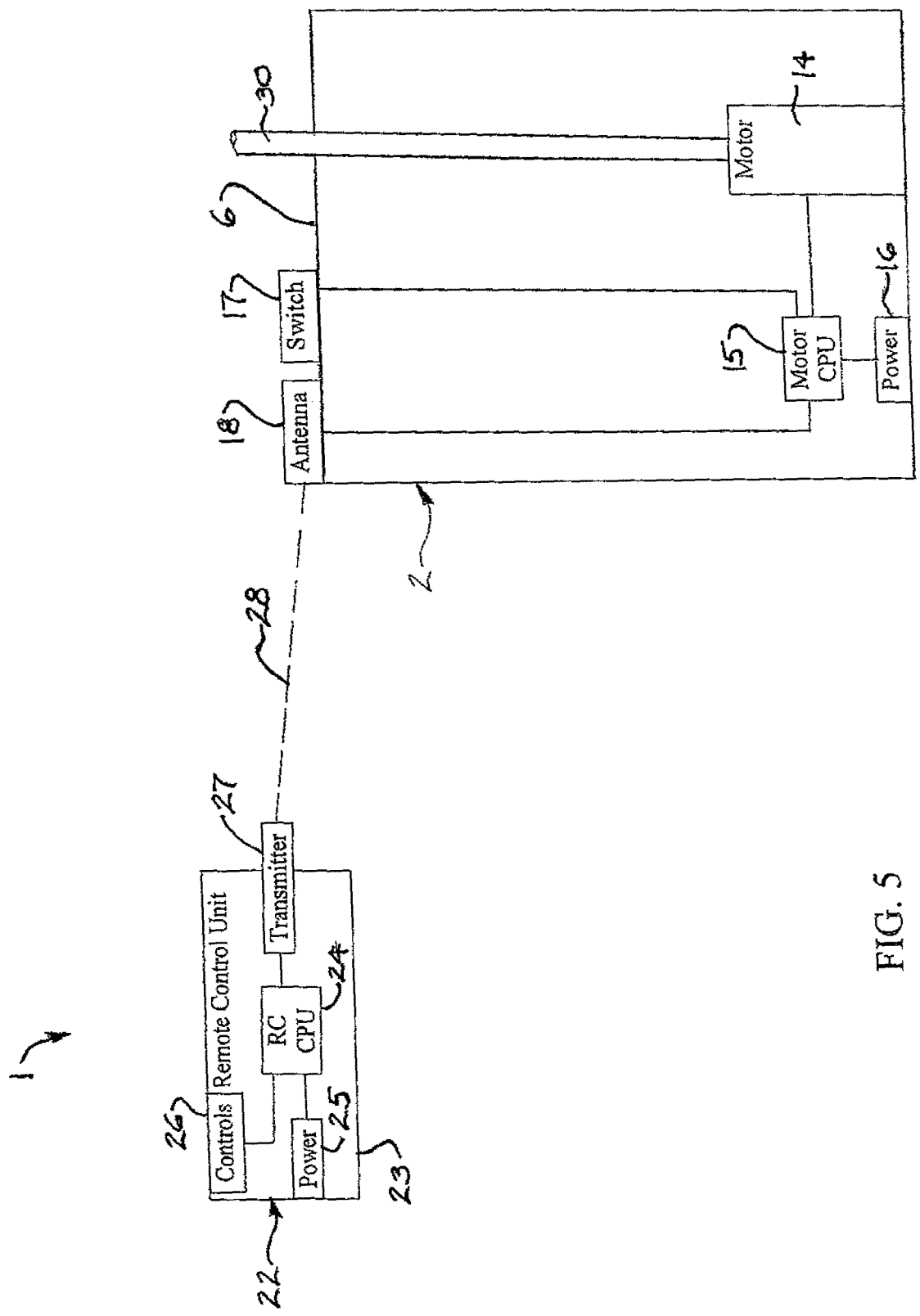
FIG. 5 is a functional block diagram of a typical swimming decoy assembly.

As illustrated in FIG. 5, a motor 14 may be provided in the assembly housing 2. A motor CPU 15 may operationally interface with the motor 14. A power source 16 may be provided in the assembly housing 2 and electrically connected to the motor CPU 15. The power source 16 may include at least one battery, solar panel, electrical outlet and/or any other source of electrical current which is consistent with supplying the required electrical current for operation of the motor 14. A motor switch 17 may be provided on the exterior of the assembly housing 2, the assembly housing lid 6 or any other suitable accessible location. The motor switch 17 may interface with the motor CPU 15 and may control on/off and operational speed of the motor 14. An antenna 18 may be provided on the assembly housing lid 6, as illustrated, or the assembly housing 2. The antenna 18 may interface with the motor CPU 15. As illustrated in FIG. 2, in some embodiments, a level 50 may be provided on the assembly housing lid 6 to facilitate proper leveling of the assembly 1 as will be hereinafter described.

As further illustrated in FIG. 5, in some embodiments, the assembly 1 may include a remote control unit 22 which is configured to selectively facilitate remote control operation of the motor 14 in the assembly housing 2 by transmitting control signals 28 to the antenna 18. The remote control unit 22 may include a remote control unit housing 23. A remote control (RC) CPU 24 may be provided in the remote control unit housing 23. A power source 25 may be electrically connected to the RC CPU 24. The power source 25 may include at least one battery and/or any other source of electrical current which is consistent with supplying the required electrical current for operation of the remote control unit 22. RC controls 26 may interface with the RC CPU 24 and may be provided on the exterior of the remote control unit housing 23 for ease of access. The RC controls 26 may include all controls which are necessary for operation of the motor 14 in the assembly housing 2 via the remote control unit 22. For example and without limitation, in some embodiments, the RC controls 26 may control the operational speed of the motor 14. A transmitter 27 may interface with the RC CPU 24. In operation of the assembly 1, which will be hereinafter described, the transmitter 27 may be adapted to transmit the control signals 28 to the antenna 18 for operation of the motor 14 responsive to input from the RC CPU 24 via the controls 26.

As illustrated in FIGS. 4 and 5, an arm drive shaft 30 may be drivingly engaged by the motor 14. The arm drive shaft 30 may extend from the interior of the assembly housing 2 through a sealed, watertight shaft opening (not illustrated) in the assembly housing lid 6. A shaft coupling 31 may be secured to the exterior protruding segment of the arm drive shaft 30 according to the knowledge of those skilled in the art. An arm hub shaft 38 may extend from the shaft coupling 31. The arm hub shaft 38 may be detachably secured in the shaft coupling 31 such as by tightening a threaded hub knob 32 against the arm hub shaft 32, for example and without limitation. In some embodiments, the height of the arm hub shaft 38 may be selected by sliding the arm hub shaft 38 upwardly or downwardly in the shaft coupling 31 and then securing the arm hub shaft 38 at the selected height by tightening the hub knob 32 against the arm hub shaft 38. An arm hub 34 may be drivingly engaged by the arm hub shaft 38. The arm hub 34 may be attached to the arm hub shaft 38 using welding, mechanical fasteners and/or other techniques known by those skilled in the art, or may alternatively be fabricated in one piece with the arm hub shaft 38. Alternative techniques known by those skilled in the art may be used to detachably secure the arm hub 34 in driving engagement with the arm drive shaft 30. In some embodiments, the arm hub 34 may be fixedly attached to the arm drive shaft 30 according to the knowledge of those skilled in the art.

Figure 1:
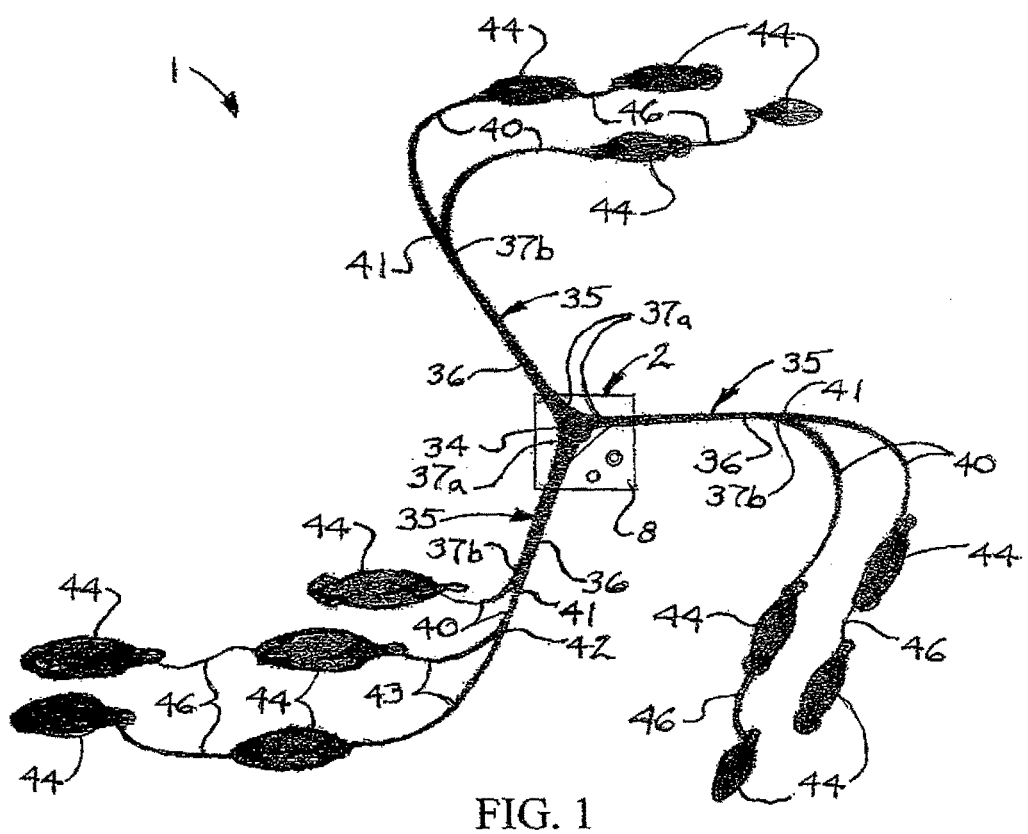
FIG. 1 is a top view of a typical swimming decoy assembly of an illustrative embodiment of the swimming decoy assemblies, systems and methods.

At least one decoy actuating arm 35 may extend outwardly from the arm hub 34. As illustrated in FIG. 1, in some embodiments, multiple decoy actuating arms 35 may extend outwardly from the arm hub 34 in equally spaced-apart relationship to each other around the arm hub 34. Each decoy actuating arm 35 may be fabricated of a flexible or bendable material such as plastic or composite material, for example and without limitation. Each decoy actuating arm 35 may include an elongated primary arm segment 36 having a proximal arm segment end 37a at the arm hub 35 and a distal arm segment end 37b opposite the proximal arm segment end 37a. Each decoy actuating arm 35 may progressively and gradually increase in flexibility or bendability from the proximal arm segment end 37a to the distal arm segment end 37b. In some embodiments, each decoy actuating arm 35 may gradually narrow or taper from the proximal arm segment end 37a to the distal arm segment end 37b.

At least two primary arm branches 40 may split or branch from the distal arm segment end 37b of the primary arm segment 36 of each decoy actuating arm 35 at a primary arm branch point 41. At least one fowl decoy 44 may be attached to each primary arm branch 40 using an attachment clip (not illustrated) or any other suitable technique known by those skilled in the art. Each primary arm branch 40 may progressively and gradually increase in flexibility or bend-ability and may gradually narrow or taper from the primary arm branch point 41 to the point of attachment of the primary arm branch 40 with the fowl decoy 44. In some embodiments, multiple fowl decoys 44 may be attached in series to each other on each primary arm branch 40 via at least one flexible or bendable decoy tether 46.

As further illustrated in FIG. 1, in some embodiments, the primary arm segment 36 of one or more of the decoy actuating arms 35 may initially branch into two or more of the primary arm branches 40 at a primary arm branch point 41, and at least one primary arm branch 40 may then branch distally into at least two secondary arm branches 43 at a secondary branch point 42. At least one fowl decoy 44 may be attached to each secondary arm branch 43. Additional, higher-order branch points (not illustrated) may branch from the secondary arm branches 43 beyond the secondary branch point or points 42, with one or more fowl decoys 44 attached to each higher-order arm branch beyond the secondary branch point or points 42. Each secondary arm branch 43 may progressively and gradually increase in flexibility or bend-ability and may gradually narrow or taper from the secondary arm branch point 42 to the point of attachment of the secondary arm branch 43 with the fowl decoy 44.

As illustrated in FIG. 3, in typical application, the assembly 1 (FIG. 1) is deployed in a water body 76 such as a shallow portion of a lake, river, stream, pond or the like. Accordingly, the arm hub 34 may be attached to the arm drive shaft 30 such as in the manner which was heretofore described with respect to FIG. 4. The assembly housing 2, with the assembly housing lid 6 closed thereon, may be placed on the bottom of the water body. The level 50 (FIG. 2) may be viewed to properly level the assembly housing 2 such that the arm drive shaft 30 is vertical and the decoy actuating arms 35 are horizontal. The height of the arm hub shaft 38 in the shaft coupling 31 (FIG. 4) may be adjusted to position the fowl decoys 44 on the respective decoy actuating arms 35 such that the fowl decoys 44 float on the surface of the water body 76 and the decoy actuating arms 35 are submerged just beneath the surface of the water body 76.

The remote control unit 22 may be used to operate the motor 14, which rotates the arm hub 34 through the arm drive shaft 30, the shaft coupling 31 and the arm hub shaft 38, respectively. Accordingly, the decoy actuating arms 35 pull the fowl decoys 44 which are attached to each decoy actuating arm 35 along the surface of the water body 76. Due to the flexibility of the primary arm segment 36, the primary arm branches 40, the secondary arm branches 43 and the decoy tethers 46 of each decoy actuating arm 35, the fowl decoys 44 initially travel in a generally straight line trajectory before turning and then following a curved path as the arm hub 34, driven by the arm hub shaft 38, rotates the decoy actuating arms 35 in a continuous circular motion. Thus, the fowl decoys 44 simulate lifelike swimming patterns of fowl for the purpose of attracting fowl in hunting, observation or other applications.

Figure 6A:
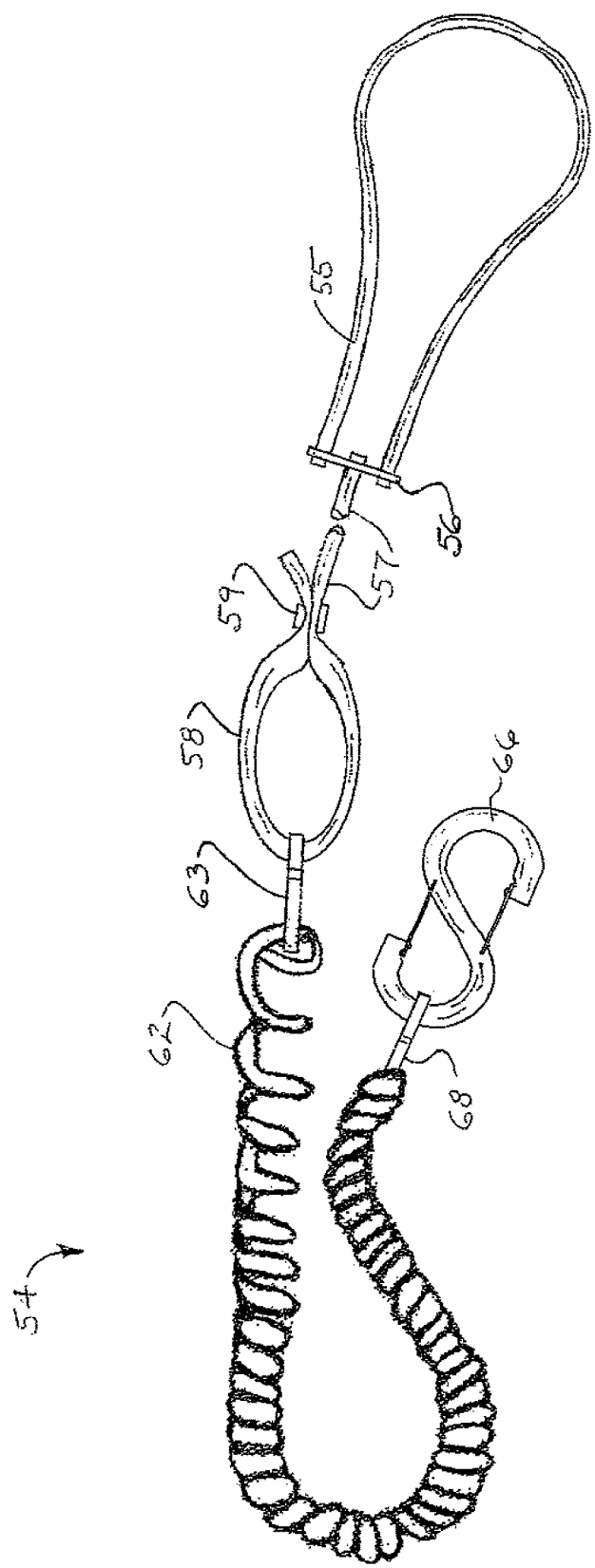
FIG. 6A is a top view of a typical tether line decoy assembly according to an illustrative embodiment of the swimming decoy assemblies, systems and methods.

Referring next to FIGS. 6A-11 of the drawings, a typical tether line decoy assembly 54 according to an illustrative embodiment of the swimming decoy assemblies, systems and methods is illustrated in FIG. 6A. The tether line decoy assembly 54 may include a decoy attachment loop 55 which may include a flexible material such as tubular rubber, for example and without limitation. An attachment loop plate 56 may secure the decoy attachment loop 55. A connecting member 57 which may include a flexible material such as tubular rubber, for example and without limitation may be attached to and extend from the attachment loop plate 56. A tether loop 58 may be formed in the connecting member 57 and secured using a suitable loop stay fastener 59. A coiled tether cord 62 may be attached to the tether loop 58 such as via a suitable cord connector 63. A tether hook 66 may be attached to the tether loop 58 such as via a suitable hook connector 68.

Figure 7:
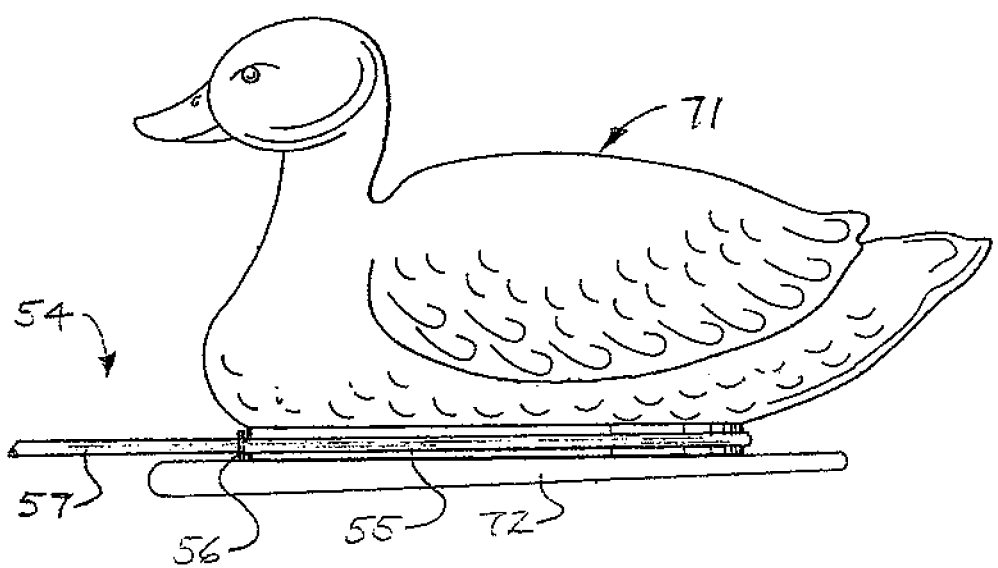
FIG. 7 is a side view of a fowl decoy attached to the tether line decoy assembly in typical application of the assembly.
Figure 11:
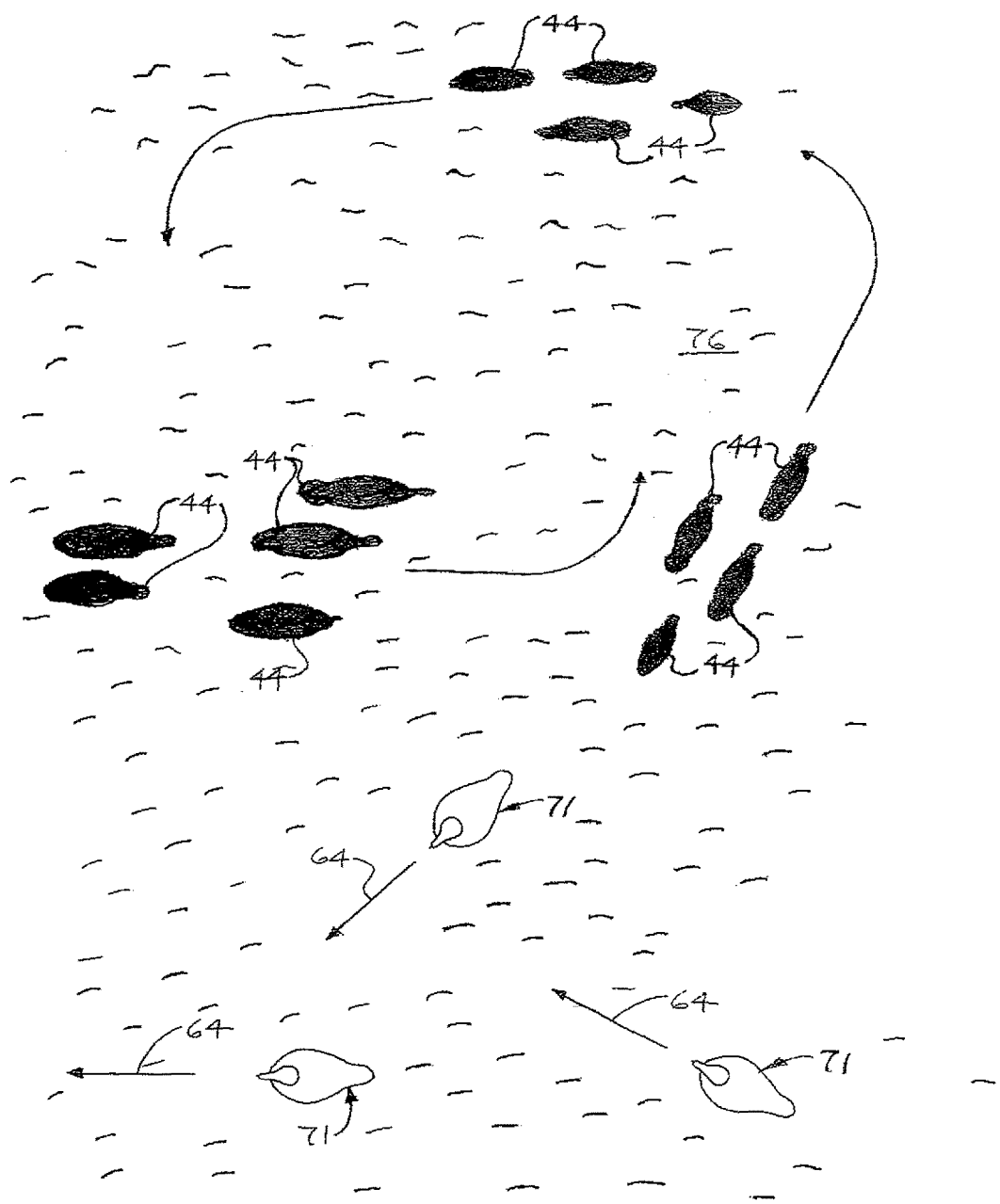
FIG. 11 is a top view of a body of water in typical application of an illustrative embodiment of the swimming decoy system.

As illustrated in FIGS. 7-9, in typical application of the tether line decoy assembly 54, a fowl decoy 71 is attached to the decoy attachment loop 55. As illustrated in FIG. 7, the fowl decoy 71 may be conventional and may include a decoy base 72. Accordingly, the decoy attachment loop 55 may be stretched, placed around the decoy base 72 and released to recoil around the decoy base 72 and attach the fowl decoy 71 to the tether line decoy assembly 54. The fowl decoy 71 may next be placed on a water body 76 (FIG. 11). A user (not illustrated) of the tether line decoy assembly 54 may hide behind an object such as a bush or the like at the edge of the water body 76 and hold the tether hook 66 and quickly pull the tether hook 66 to rapidly stretch or tension the coiled tether cord 62. The stretched or tensioned tether cord 62 subsequently recoils and pulls the fowl decoy 71 generally along a linear axis 64 (FIG. 8) on the surface of the water body 76. The tether hook 66 can be repeatedly pulled and the tether cord 62 stretched in like manner to repeat the linear movement of the fowl decoy 71. It will be appreciated by those skilled in the art that the stretched or tensioned tether cord 62 may apply a steady, continuous and uniform pulling force to the attached fowl decoy 71 so that the fowl decoy 71 moves in a slow and sustained linear motion along the linear axis 64. Thus, the fowl decoy 71 simulates lifelike swimming patterns of fowl for the purpose of attracting fowl in hunting, observation or other applications.

As illustrated in FIG. 9, in some applications, multiple tether line decoy assemblies 54 can be attached to each other to facilitate independent linear movement of multiple fowl decoys 71 on the surface of the water body 76 (FIG. 11). Accordingly, a second tether line decoy assembly 54b can be attached to a first tether line decoy assembly 54a by fastening the tether hook 66 on the second tether line decoy assembly 54b to the tether loop 58 on the first tether line decoy assembly 54a. A third tether line decoy assembly 54c can in like manner be attached to the second tether line decoy assembly 54b by fastening the tether hook 66 on the third tether line decoy assembly 54c to the tether loop 58 on the second tether line decoy assembly 54b. As illustrated in FIG. 11, after the fowl decoys 71 are placed on the water body 76, a user can quickly pull the tether hook 66 on the first tether line decoy assembly 54a to stretch and tension the tether cords 62 of the first tether line decoy assembly 54a, the second tether line decoy assembly 54b and the third tether line decoy assembly 54c, respectively. The stretched or tensioned tether cords 62 subsequently recoil and apply a steady, continuous and uniform pulling force to the attached fowl decoys 71 so that the fowl decoys 71 move together in a slow and sustained linear motion along the linear axes 64 on the surface of the water body 76 and simulate lifelike swimming patterns of fowl for the purpose of attracting fowl in hunting, observation or other applications.

As illustrated in FIGS. 10 and 11, in some applications, the swimming decoy assembly 1 which was heretofore described with respect to FIGS. 1-5 and multiple tether line decoy assemblies 54 which were heretofore described with respect to FIG. 9 can be used simultaneously as a swimming decoy system 100 (FIG. 10). Accordingly, the fowl decoys 44 of the swimming decoy assembly 1 simulate the straight and curved swimming paths and the fowl decoys 71 of the connected tether line decoy assemblies 54 simulate the straight swimming paths to simulate lifelike swimming patterns of fowl for the purpose of attracting fowl in hunting, observation or other applications.

Figure 6B:
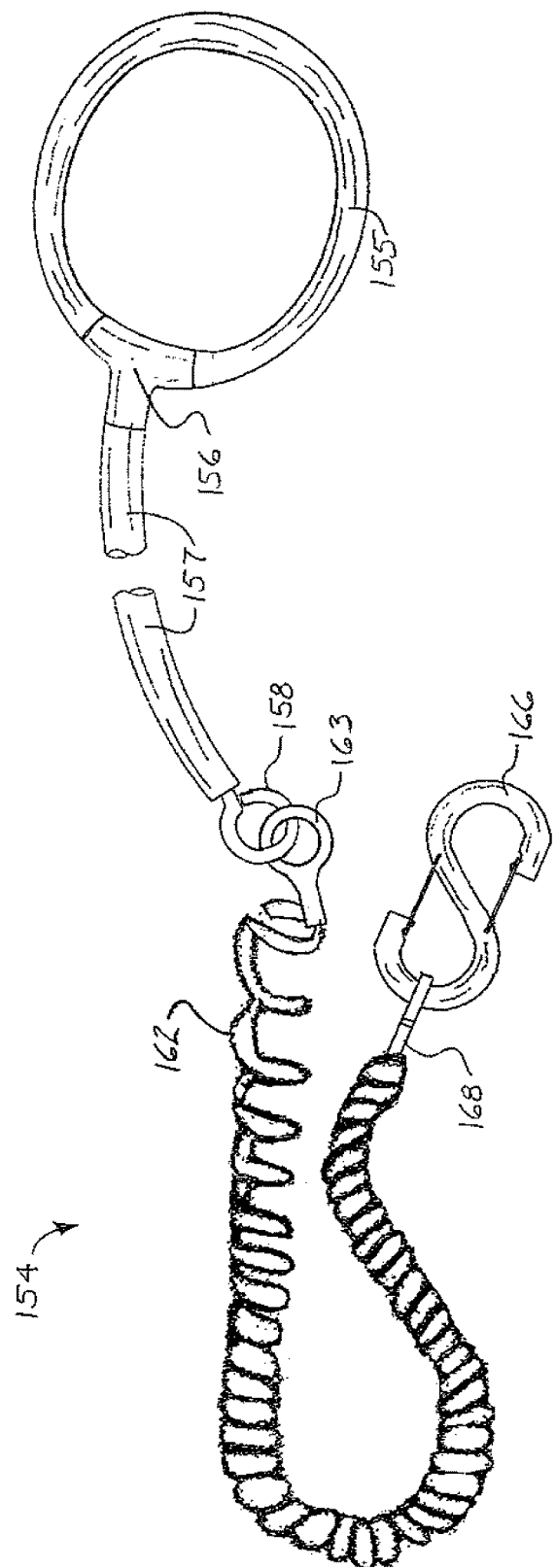
FIG. 6B is a top view of a typical alternative tether line decoy assembly according to an illustrative embodiment of the swimming decoy assemblies, systems and methods.

As illustrated in FIG. 6B, a typical alternative tether line decoy assembly 154 according to an illustrative embodiment of the swimming decoy assemblies, systems and methods is illustrated. In the tether line decoy assembly 154, elements which are analogous to the respective elements of the tether line decoy assembly 54 that was heretofore described with respect to FIG. 6A are designated by the same numerals in the 100 series in FIG. 6B. A tee fitting 156 may attach the decoy attachment loop 155 to the connecting member 157, each of which may include flexible tubing in some embodiments. The tether loop 158 of the tether line decoy assembly 154 may include an eyehook or the like which may be metal, plastic or other substantially rigid or semi-rigid material and attached to the connecting member 157 according to the knowledge of those skilled in the art. The cord connector 163 may include a terminal connector hook or the like which may be metal, plastic or other substantially rigid or semi-rigid material.

Application of the tether line decoy assembly 154 may be as was heretofore described with respect to the tether line decoy assembly 54 in FIG. 8 to simulate the appearance of a single fowl swimming along a linear path on the surface of a water body 76 (FIG. 11). In some applications, multiple tether line decoy assemblies 154 may be attached to each other by attaching the tether hook 166 on one or more of the tether line decoy assemblies 154 to the tether loop 158 or the cord connector 163 of another tether line decoy assembly 154, as was heretofore described with respect to the tether line decoy assemblies 54a, 54b, 54c in FIG. 9. Multiple decoys 71 may be attached to the decoy attachment loops 155 of the respective tether line decoy assemblies 154 to simulate the appearance of multiple fowl swimming on the surface of a water body 76 as was heretofore described with respect to FIG. 11.

Referring next to FIGS. 12-17 of the drawings, a typical alternative swimming decoy assembly 101 of an illustrative embodiment of the swimming decoy assemblies, systems and methods is illustrated. In the assembly 101, elements which are analogous to the respective elements of the assembly 1 that was heretofore described with respect to FIGS. 1-5 are designated by the same numerals in the 100 series in FIGS. 12-17. Each decoy actuating arm 135 may have a proximal arm segment end 137a and a distal arm segment end 137b. The proximal arm segment end 137a may be fixedly or releasably attached to the arm hub 134 according to the knowledge of those skilled in the art. A non-limiting example of a method or technique which is suitable for the purpose may include interfacing an arm sleeve 145 on the proximal arm segment end 137a of the decoy actuating arm 135 with a companion peg or other mechanical component (not illustrated) at the arm hub 134. Each decoy actuating arm 135 may include at least one arm segment 136. In some embodiments, each decoy actuating arm 135 may include a pair of arm segments 136 which may be selectively detachably attached to each other according to the knowledge of those skilled in the art. As illustrated in FIGS. 14 and 15, in some embodiments, a detachable arm segment 136 may be detachably inserted in an arm segment connector sleeve 180 which is provided on the adjacent arm segment 136. An elastic arm segment connecting cord 139 may connect the adjacent arm segments 136 to each other and normally maintain the detachable arm segment 136 inserted in the arm segment connector sleeve 180. The detachable arm segment 136 can be selectively removed from the arm segment connector sleeve 180 against the pulling force applied by the arm segment connecting cord 139 to selectively disassemble the arm segment 136 for transport and/or storage of the assembly 101.

Figure 17:
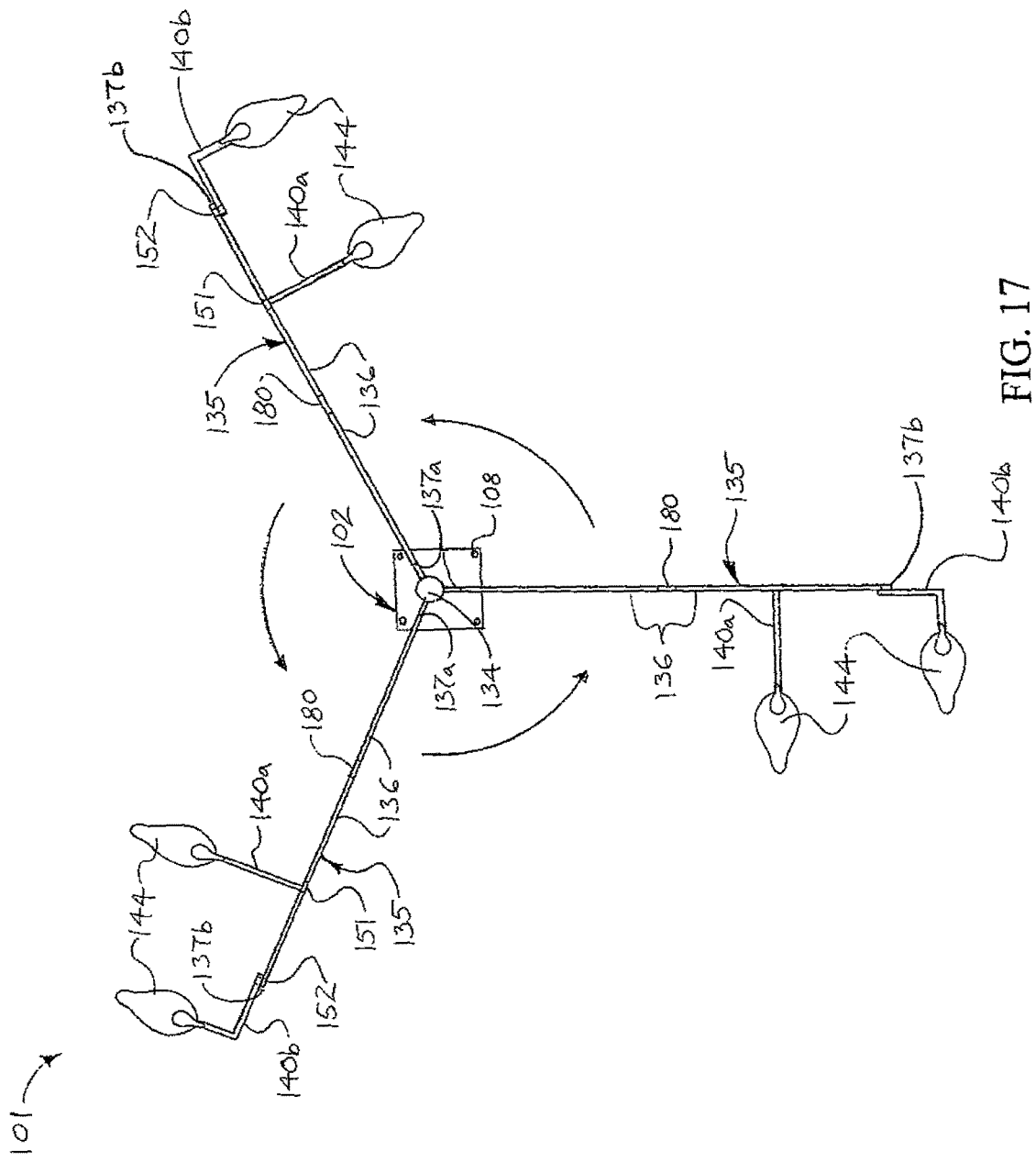
FIG. 17 is a top view of the swimming decoy assembly illustrated in FIG. 12 with a pair of fowl decoys attached to each decoy actuating arm in typical application of the assembly.

A proximal arm branch 140a may branch from each decoy actuating arm 135 between the proximal arm segment end 137a and the distal arm segment end 137b. In some embodiments, the proximal arm branch 140a may be closer to the distal arm segment end 137b than to the proximal arm segment end 137a of each decoy actuating arm 135. A proximal decoy attachment loop 148a may terminate the proximal arm branch 140a. As illustrated in FIG. 17, in typical application of the assembly 101, which will be hereinafter described, a fowl decoy 144 may be attached to the proximal decoy attachment loop 148a typically in the same manner as was heretofore described with respect to FIG. 7. The proximal arm branch 140a and the proximal decoy attachment loop 148a may each include a flexible, elastic or resilient material such as rubber tubing, for example and without limitation, and may be attached to the decoy actuating arm 135 according to the knowledge of those skilled in the art. For example and without limitation, in some embodiments, a proximal arm attachment wire 151 may attach the proximal arm branch 140*a* to the decoy actuating arm 135.

Figure 12:
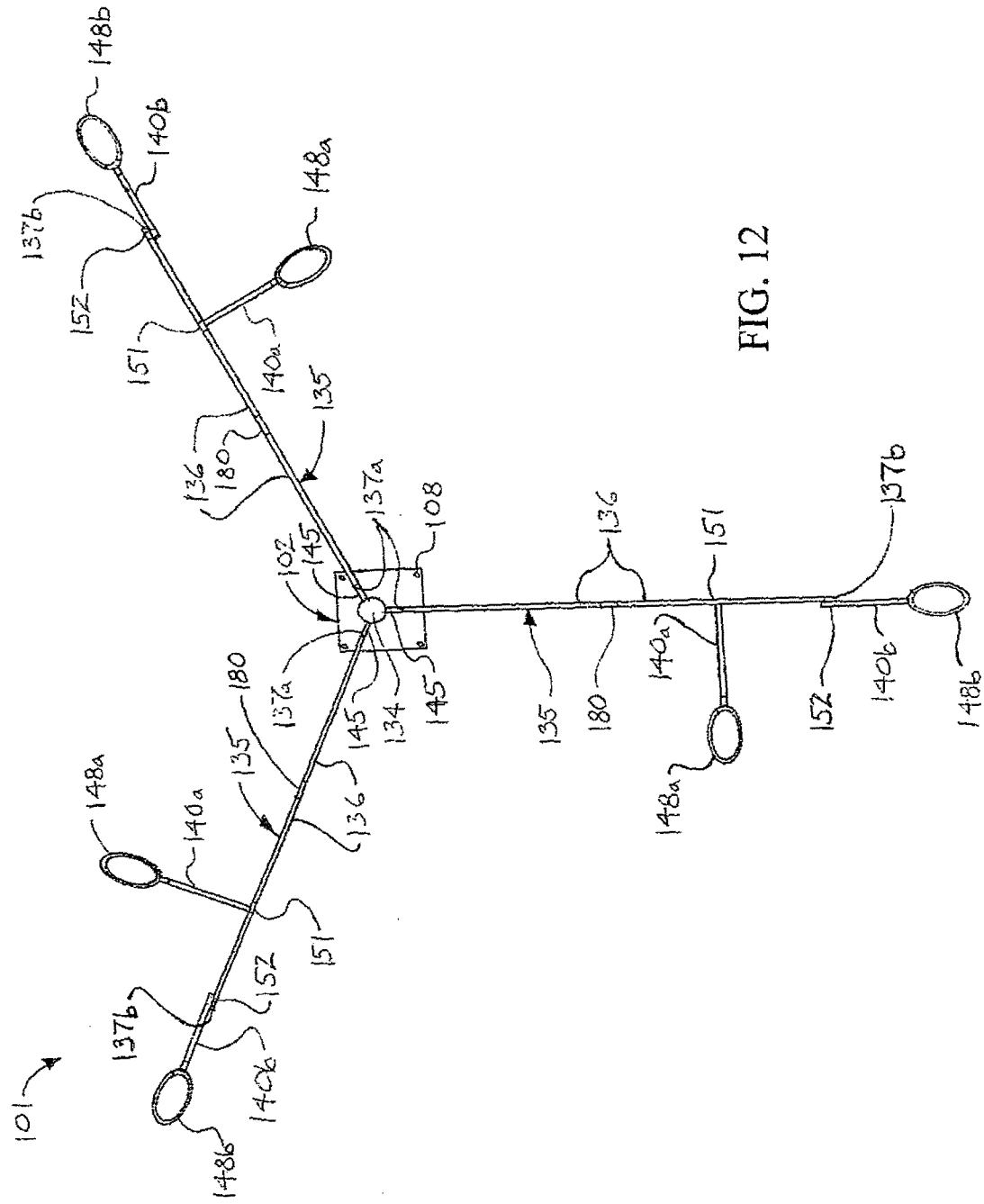
FIG. 12 is a top view of a typical alternative swimming decoy assembly of an illustrative embodiment of the swimming decoy assemblies, systems and methods.

As further illustrated in FIG. 12, a distal arm branch 140*b* may extend beyond the distal arm segment end 137*b* of each decoy actuating arm 135. A distal decoy attachment loop 148*b* may terminate the distal arm branch 140*a*. The distal arm branch 140*b* and the distal decoy attachment loop 148*b* may each include a flexible, elastic or resilient material such as rubber tubing, for example and without limitation, and may be attached to the decoy actuating arm 135 via a distal arm attachment wire 152, as particularly illustrated in FIG. 16, or other suitable attachment technique.

Figure 16:
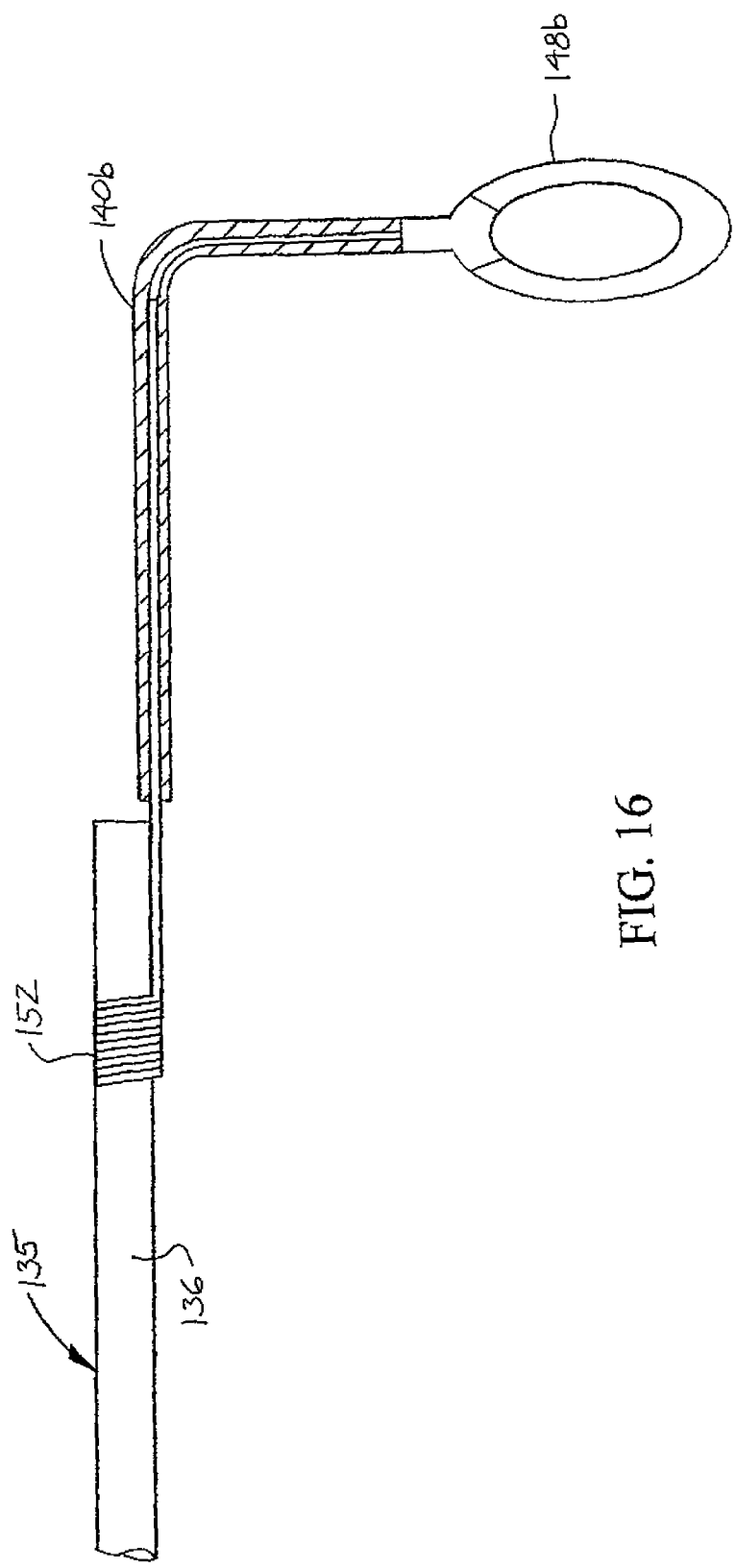
FIG. 16 is a sectional view of a typical distal arm branch which attaches a distal decoy attachment loop to a decoy actuating arm on the swimming decoy assembly illustrated in FIG. 12.

As illustrated in FIG. 17, in typical application, fowl decoys 144 are attached to the proximal decoy attachment loop 148*a* and the distal decoy attachment loop 148*b* (FIG. 12) on each decoy actuating arm 135. The apparatus 101 is deployed in a water body (not illustrated) with the fowl decoys 144 floating on the surface of the water body. The motor 14 (FIG. 4) in the assembly housing 102 rotates the arm hub 134 and the decoy actuating arms 135 as the fowl decoys 144 simulate a circular swimming motion on the water body to attract water fowl to the area in which the apparatus 101 is deployed for hunting, observation or other purposes. As illustrated in FIGS. 16 and 17, due to the resistance of the fowl decoy 144 in the water, the flexible distal arm branch 140*b* may bend at a generally 90-degree angle to the longitudinal axis of the decoy actuating arm 135. Thus, the fowl decoys 144 on each decoy actuating arm 135 may appear to swim in generally parallel and tandem relationship with each other.

It will be appreciated by those skilled in the art that the elongated flexible construction of the proximal arm branch 140*a* and the distal arm branch 140*b* on each decoy actuating arm 135 may enable the respective attached fowl decoys 144 to swim in a side-to-side motion as they follow the circular trajectory of the decoy actuating arms 135 responsive to current in the water body, thus enhancing the lifelike simulated swimming appearance of the fowl decoys 144. Moreover, in some applications, the motor 14 (FIG. 4) inside the assembly housing 102 may be operated at various speeds. Therefore, the distal arm branch 140*b* may flex and bend or swing between the straight configuration illustrated in FIG. 12 and the bended configuration illustrated in FIGS. 13, 16 and 17 according to the different speeds and resistances of the water against the fowl decoy 144 attached to the distal arm branch 140*b*. Thus, the fowl decoy 144 may appear to swim in a pronounced side-to-side motion to additionally enhance the lifelike appearance of the fowl decoy 144.

Figure 18:
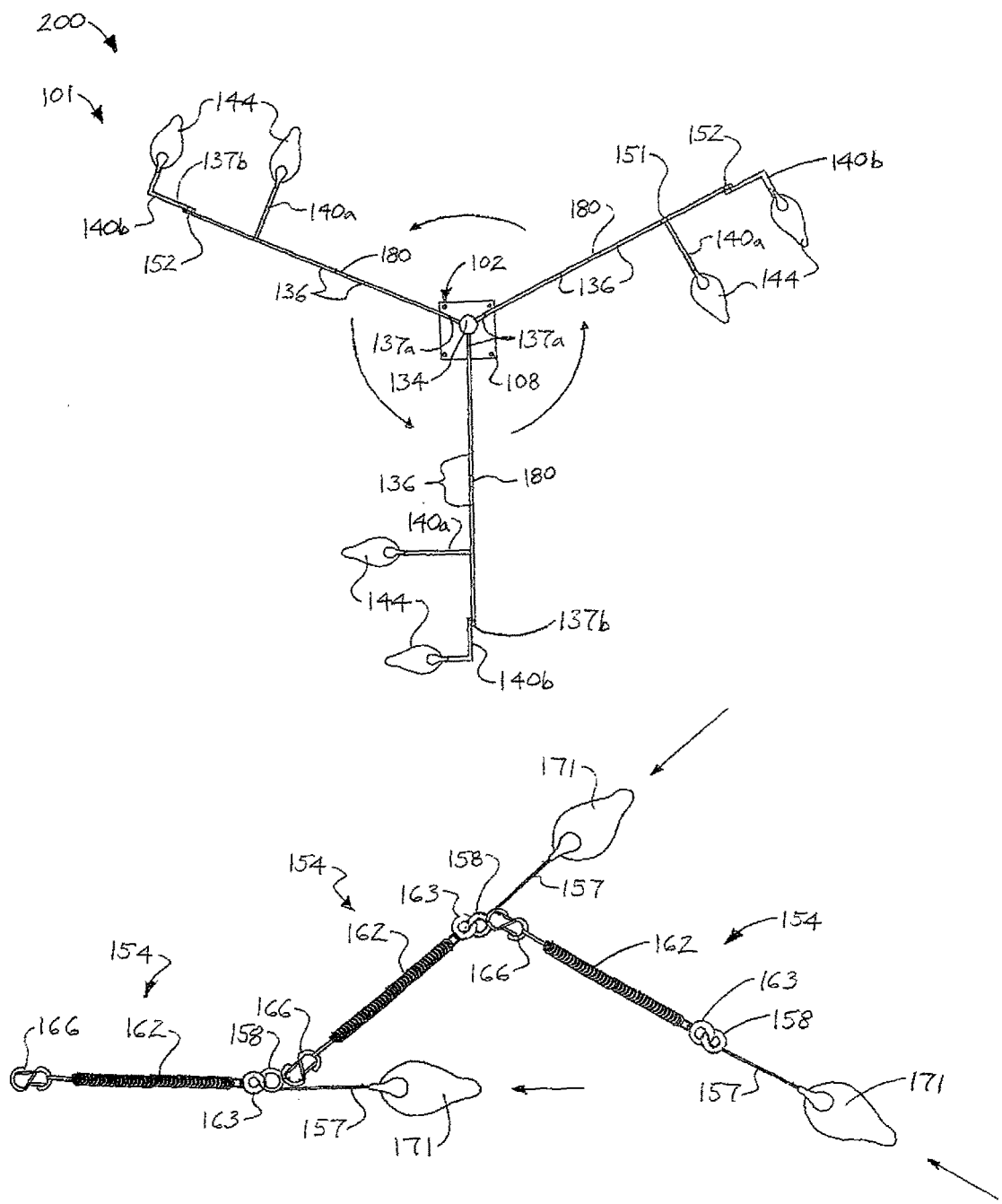
FIG. 18 is a top view of a swimming decoy system which includes the illustrative swimming decoy assembly illustrated in FIG. 12 and multiple tether line decoy assemblies illustrated in FIG. 6B in typical application of the system.

Referring next to FIG. 18 of the drawings, in some applications, the swimming decoy assembly 101 which was heretofore described with respect to FIGS. 12-17 and multiple tether line decoy assemblies 154 which were heretofore described with respect to FIG. 6B can be used simultaneously as a swimming decoy system 200. Accordingly, the fowl decoys 144 of the swimming decoy assembly 101 simulate the curved or circular tandem swimming paths and the fowl decoys 171 of the connected tether line decoy assemblies 154 simulate the straight or linear swimming paths to simulate lifelike swimming patterns of fowl for the purpose of attracting fowl in hunting, observation or other applications.

Figure 19:
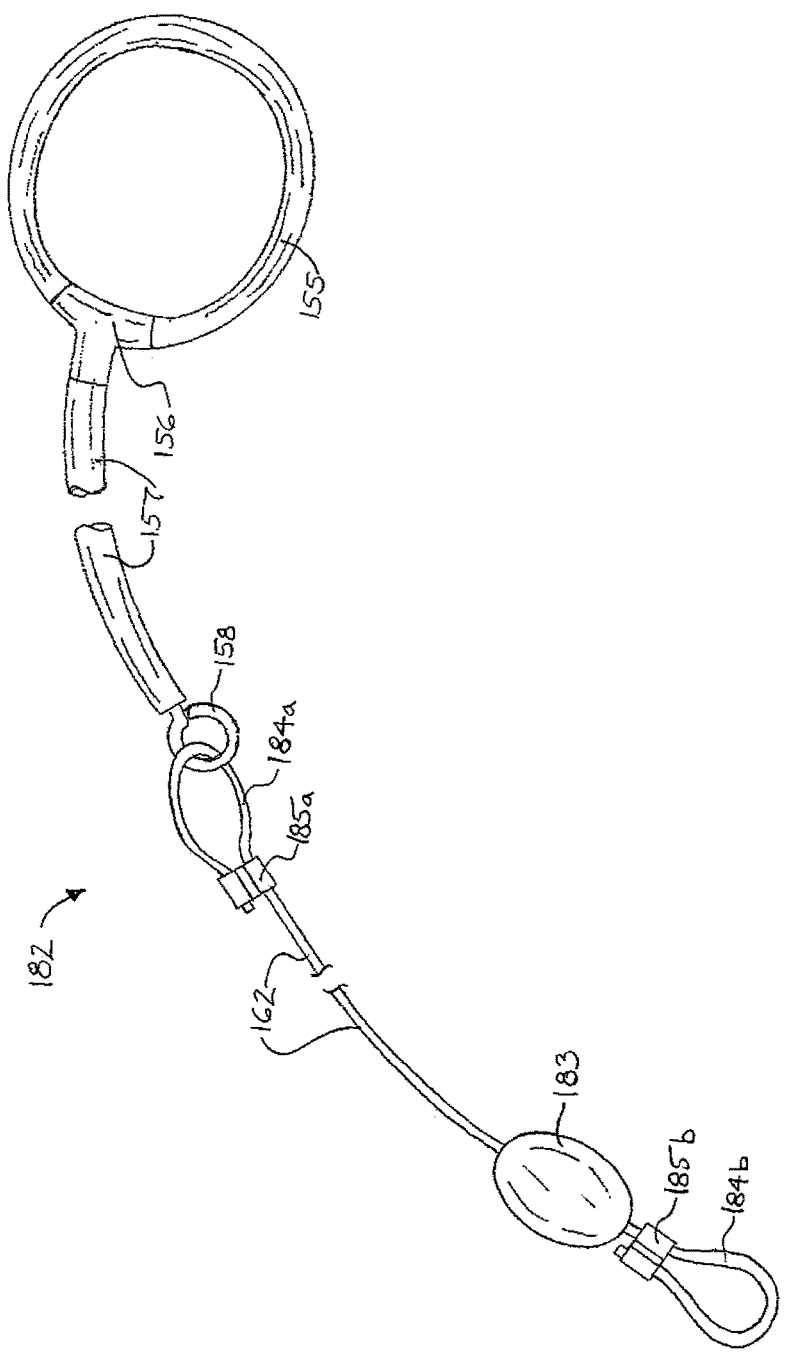
FIG. 19 is a perspective view of an illustrative embodiment of a weighted decoy assembly.
Figure 20:
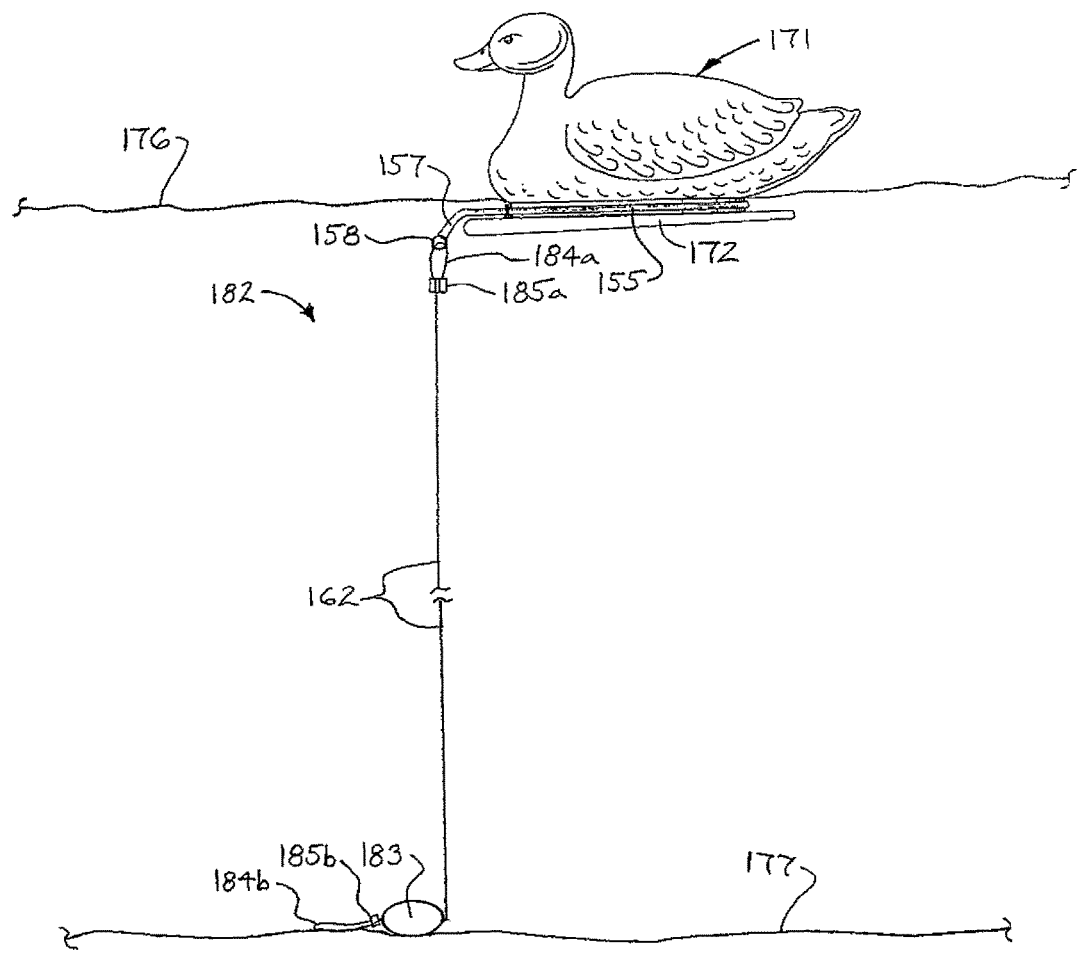
FIG. 20 is a side view of a waterfowl decoy, deployed on a water body with the illustrative weighted decoy assembly attached to the waterfowl decoy and weighting the decoy in the water body.
Figure 21:
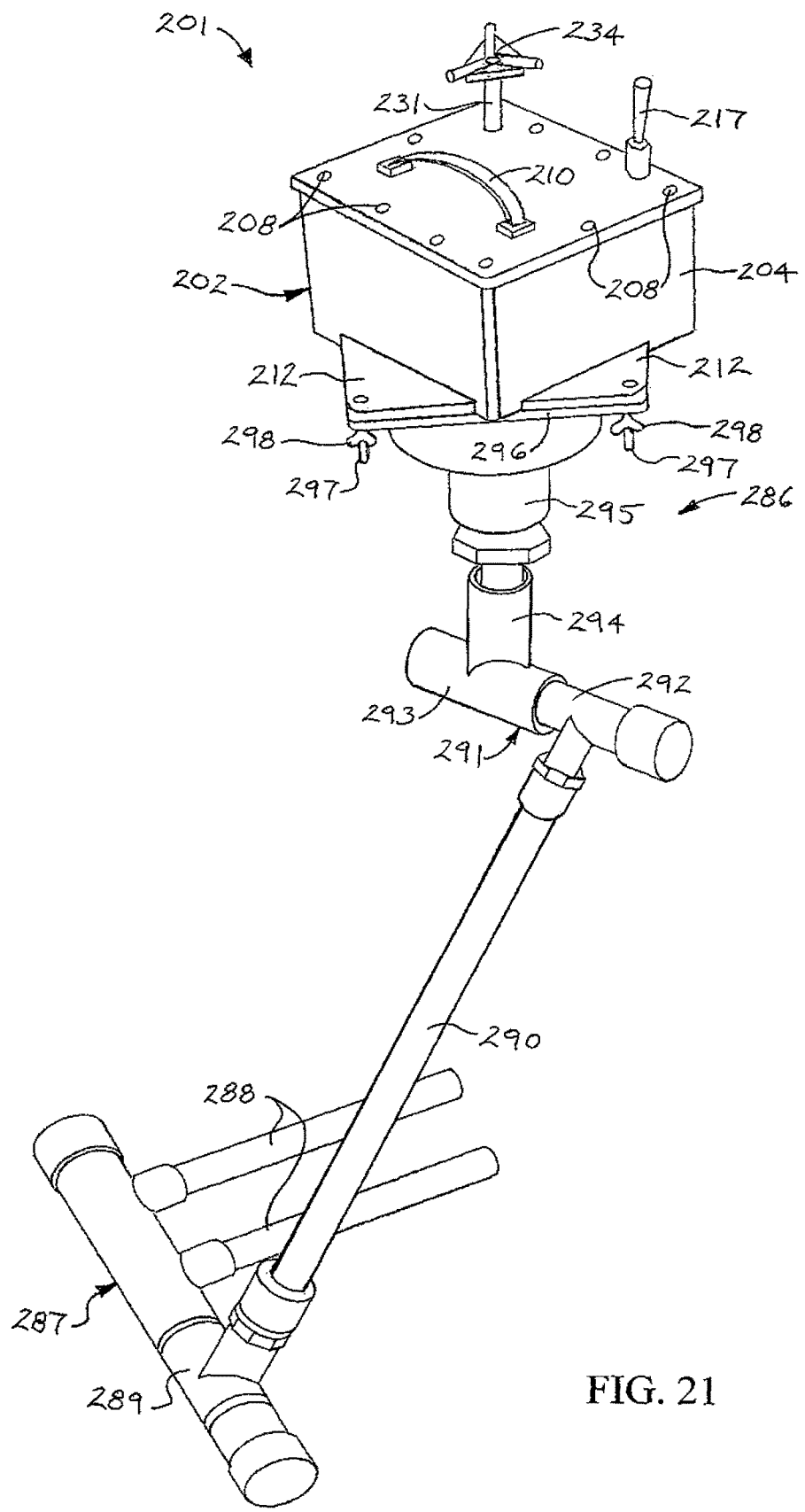
FIG. 21 is a perspective view of a typical assembly housing and pedestal assembly according to an alternative illustrative embodiment of the swimming decoy assembly.

Referring next to FIGS. 19 and 20 of the drawings, an illustrative embodiment of a weighted decoy assembly 182 may include a decoy attachment loop 155. The decoy attachment loop 155 may include a flexible material such as tubular rubber, for example and without limitation. A connecting member 157 which may be of like material may extend from the decoy attachment loop 155. A tee fitting 156, which may be flexible tubing, may attach the decoy attachment loop 155 to the connecting member 157. A tether loop 158 may be formed in or attached to the connecting member 157.

A tether cord 162 may be attached to the tether loop 158 such as via a suitable first cord loop 184*a* secured with a first cord stay 185*a*. A second cord loop 184*b* secured with a second cord stay 185*b* may terminate the distal or extending end of the tether cord 162. A weight 183 may be provided on the tether cord 162. In some embodiments, the weight 183 may be mounted for sliding displacement on the tether cord 162 between the first cord stay 185*a* and the second cord stay 185*b*.

As illustrated in FIG. 20, in typical application of the weighted decoy assembly 182, the decoy attachment loop 155 is initially stretched and placed around the decoy base 172 of a fowl decoy 171 and then released to recoil around the decoy base 172. The connecting member 157 typically extends forwardly from the front of the decoy base 172. The fowl decoy 171 is placed on a water body 176, and the weight 183 is dropped and allowed to descend in the water body 176. In some applications, the weight 183 may rest on the water body bottom 177 of the water body 176, as illustrated. Accordingly, the weight 183 anchors the fowl decoy 171 on the water body 176 to prevent the fowl decoy 171 from being carried away from the deployment location by the currents in the water body 176. It will be appreciated by those skilled in the art that in some embodiments, the weight 183 may slide to any position along the length of the tether cord 162 to rest on a water body bottom 177 having a depth which corresponds to the position of the weight 183 on the tether cord 162. The weighted decoy assembly 182 can be used alone or in a swimming decoy system including a combination with the swimming decoy assembly 1 (FIGS. 1-11), the swimming decoy assembly 101 (FIGS. 12-18), the tether line decoy assembly 54 (FIG. 6A), the tether line decoy assembly 154 (FIG. 6B), or any combination thereof.

Referring next to FIGS. 21-28 of the drawings, another alternative illustrative embodiment of the swimming decoy assembly is generally indicated by reference numeral 201. Unless otherwise noted, elements which are analogous to the respective elements of the assembly 1 that was heretofore described with respect to FIGS. 1-11 and the assembly 101 that was heretofore described with respect to FIGS. 12-18 are designated by the same numerals in the 200-299 series in FIGS. 21-28. The swimming decoy assembly 201 includes an assembly housing 202 which may have the same design and contain the same components as the assembly housing 2 of the swimming decoy assembly 1. In some embodiments, a pedestal assembly 286 may support the assembly housing 202. The pedestal assembly 286 may include a pedestal assembly base 287. At least one pedestal stake 288 may extend from the pedestal assembly base 287. A rotatable leg connecting base segment 289 may be provided in the pedestal assembly base 287.

An elongated pedestal leg 290 may extend from the leg connecting base segment 289. The pedestal leg 290 may pivot with respect to the pedestal assembly base 287 as the leg connecting base segment 289 rotates. A pedestal assembly arm 291 may be provided on the pedestal leg 290. The pedestal assembly arm 291 may include a leg connecting arm segment 292 which is perpendicular to the pedestal leg 290 and a housing support segment 293 which is rotatable with respect to the leg connecting arm segment 292. The housing support segment 293 may be rotatable with respect to the leg connecting arm segment 292 of the pedestal assembly arm 291. An arm collar 294 may protrude from the housing support segment 293.

A housing support base 295 may be provided on the arm collar 294. A housing support base plate 296 may be provided on the housing support base 295. The assembly housing 202 may be mounted on the housing support base plate 296 according to the knowledge of those skilled in the art. Accordingly, housing flanges 212 may protrude from the assembly housing wall 204 of the assembly housing 202. Housing fasteners 297 may be extended through registering housing fastener openings (not illustrated) in the respective housing flanges 212 and the housing support base plate 296. A wing nut 298 may be threaded and tightened on each housing fastener 297. Accordingly, the assembly housing 202 can be selectively detached and removed from the housing support base plate 296 of the pedestal assembly 286 by unthreading and removing the wing nuts 298 from the respective housing fasteners 297, removing the housing fasteners 297 from the respective housing fastener openings and lifting the assembly housing 202 from the housing support base plate 296.

As illustrated in FIGS. 22-24, the pedestal assembly 286 can be selectively configured to support the assembly housing 202 at a selected height to accord with the depth of a water body 276 (FIG. 25) in which the swimming decoy assembly 201 is to be deployed by pivoting the pedestal leg 290 with respect to the pedestal assembly base 287 at the rotating leg connecting base segment 289 and/or pivoting the housing support base 295 relative to the pedestal leg 290 at the rotating housing support segment 293 of the pedestal assembly arm 291. This may be accomplished by initially inserting the pedestal stake 288 into the water body bottom 277 (FIG. 25) of the water body 276 in which the swimming decoy assembly 201 is deployed; grasping the handle 210 on the assembly housing 202; and pushing the assembly housing 202 away from the user such that the pedestal assembly arm 290 pivots relative to the pedestal assembly base 287 and the housing support base 295 pivots relative to the pedestal assembly arm 290, as illustrated in FIGS. 23 and 24, typically until the assembly housing 202 is positioned just beneath the surface of the water body 276. The rotational tension of the leg connecting base segment 289 in the pedestal assembly base 287 and of the leg support segment 293 on the leg connecting arm segment 292 may be selected such that the pedestal assembly 286 is capable of holding its position when the user releases the handle 210. In some applications, the pedestal assembly 286 may be used with the swimming decoy assembly 1 of FIGS. 1-12.

Figure 25:
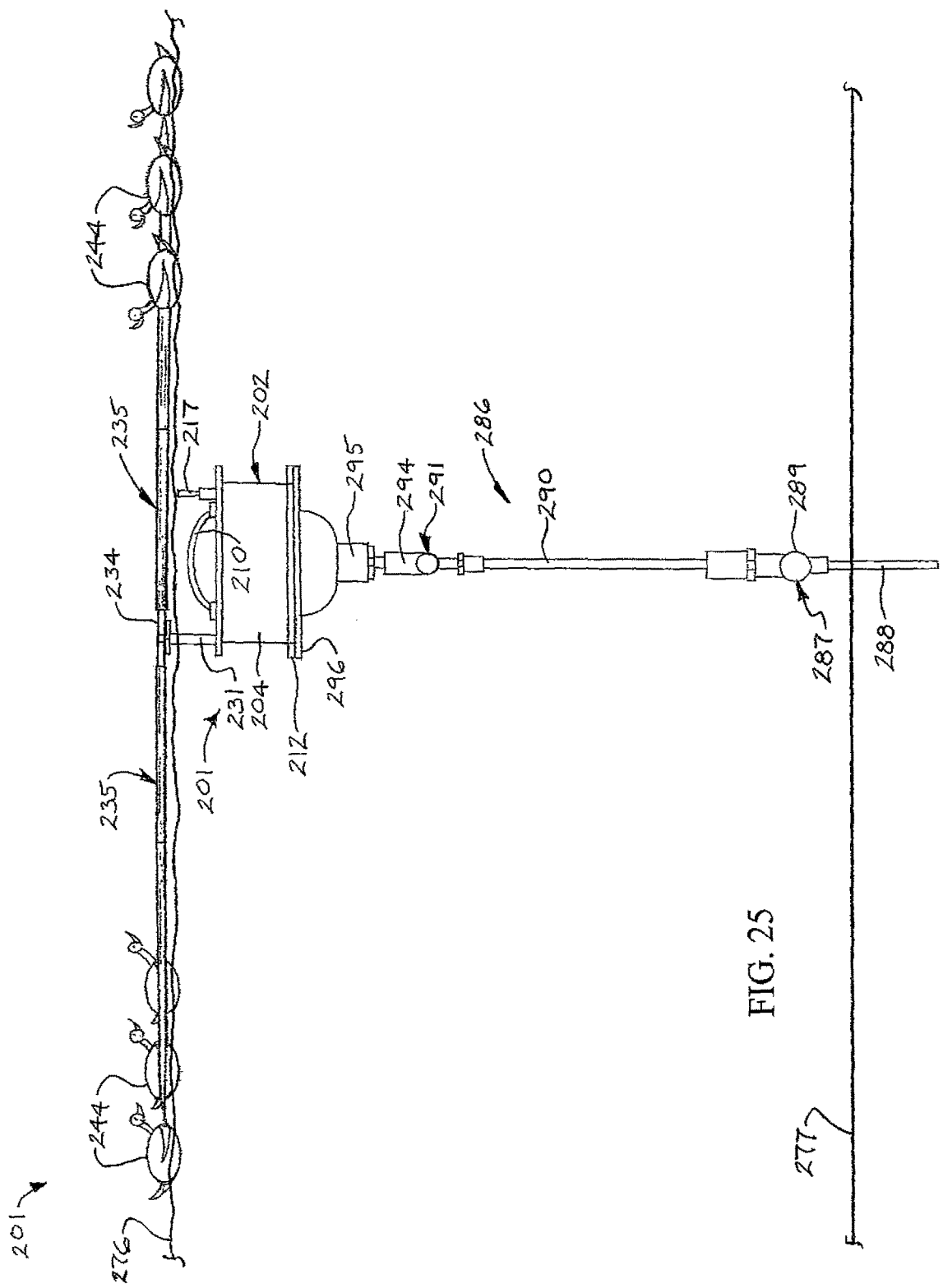
FIG. 25 is a side view of the swimming decoy assembly which includes the assembly housing and pedestal assembly illustrated in FIGS. 21-24, deployed in a water body with multiple waterfowl decoys attached to the assembly in typical application thereof.
Figure 26:
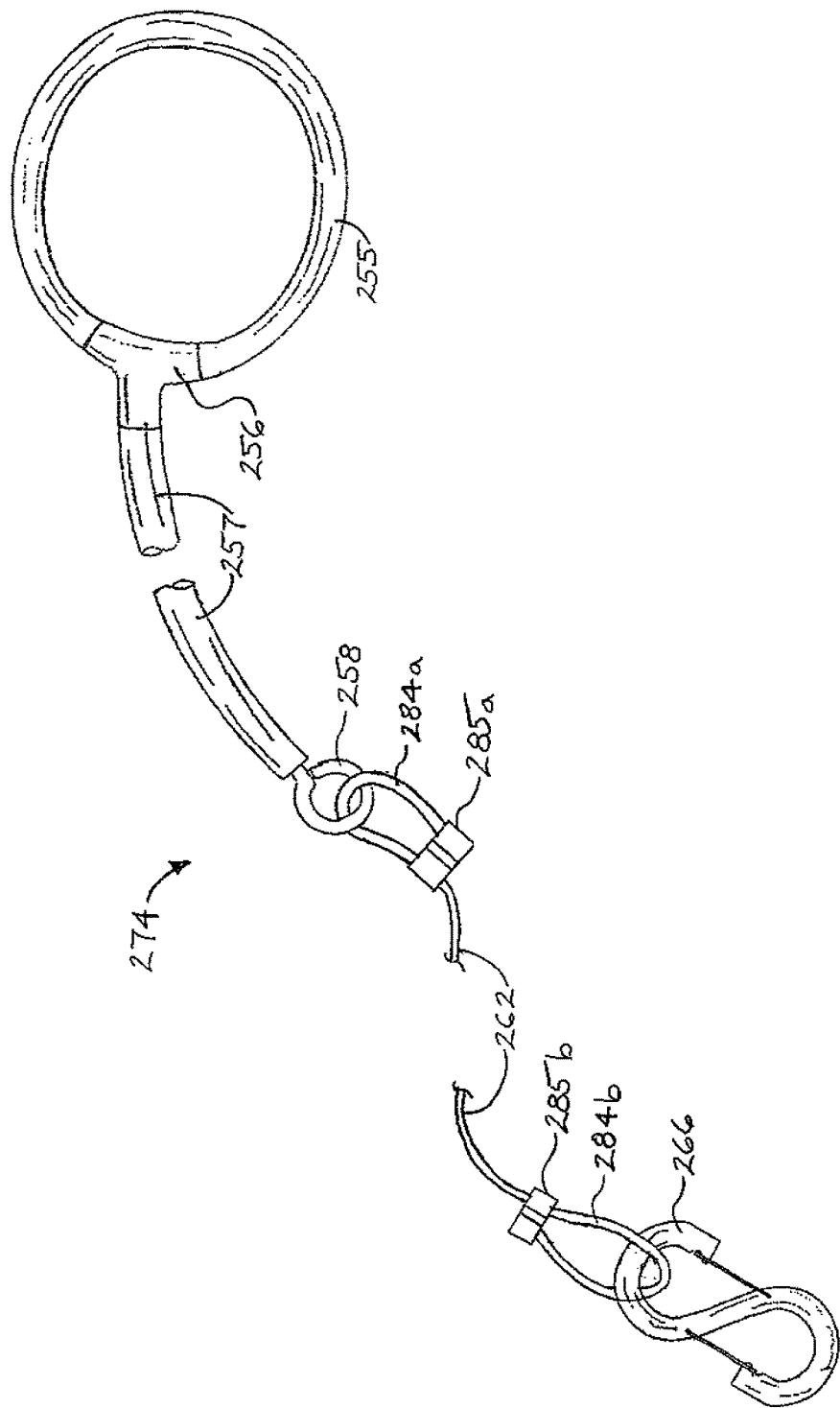
FIG. 26 is a perspective view, partially in section, of a typical tether line decoy assembly which is suitable for tethering a waterfowl decoy to a decoy actuating arm of the swimming decoy assembly illustrated in FIG. 25.
Figure 27:
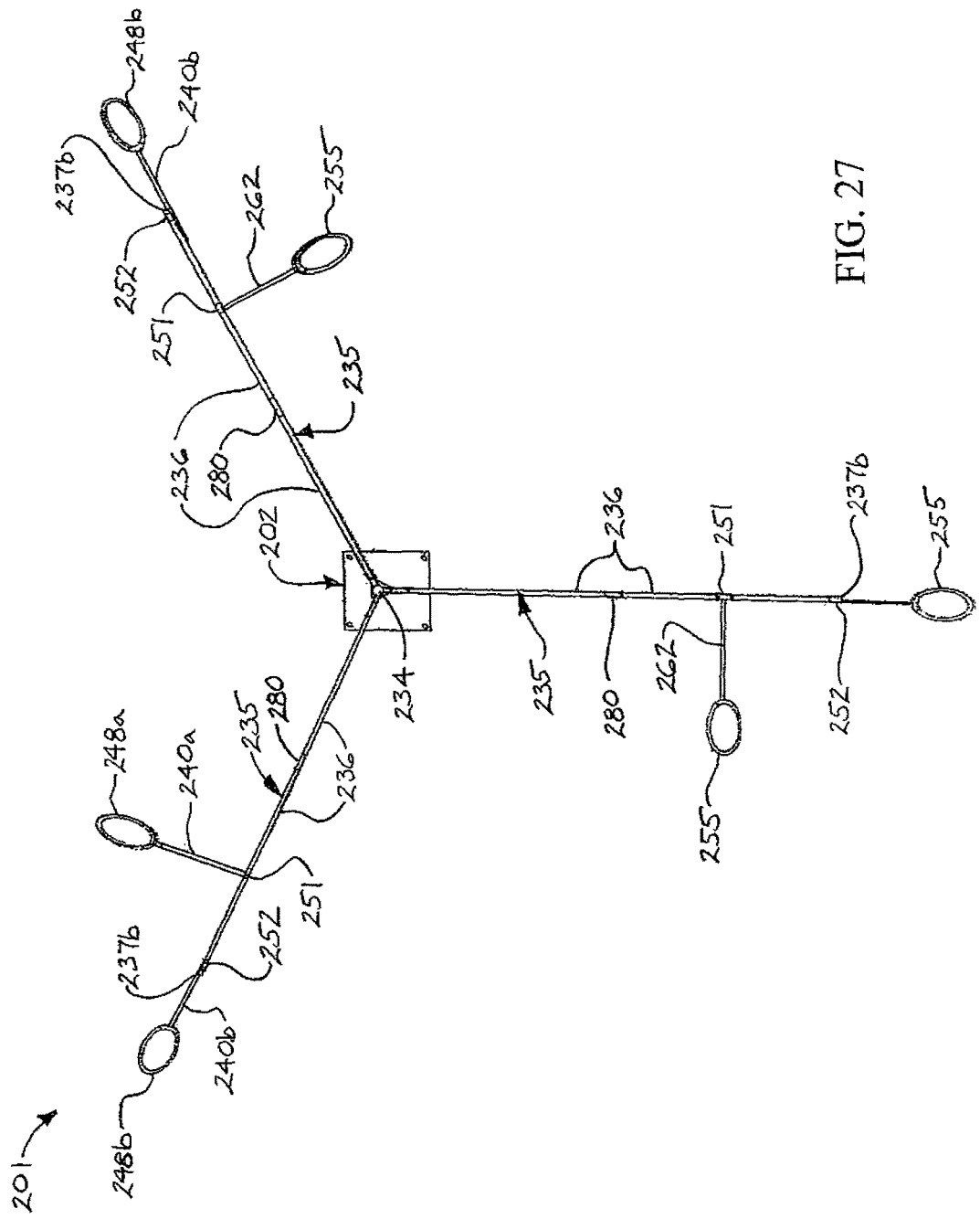
FIG. 27 is a top view of the swimming decoy assembly illustrated in FIG. 25, with the waterfowl decoys removed from the respective decoy attachment loops of the tether line decoy assemblies.

As illustrated in FIGS. 25-27, in typical use, the swimming decoy assembly 201 is deployed in a water body 276 by initially inserting the stake or stakes 288 of the pedestal assembly base 287 on the pedestal assembly 286 into the water body bottom 277, as illustrated in FIG. 25, and then configuring the height of the pedestal assembly 286 to support the assembly housing 202 typically just beneath the surface of the water body 276, as was heretofore described with respect to FIGS. 22-24. As illustrated in FIGS. 25 and 27, the decoy actuating arms 235 may be threaded into or otherwise attached to the arm hub 234 on the assembly housing 202.

Figure 28:
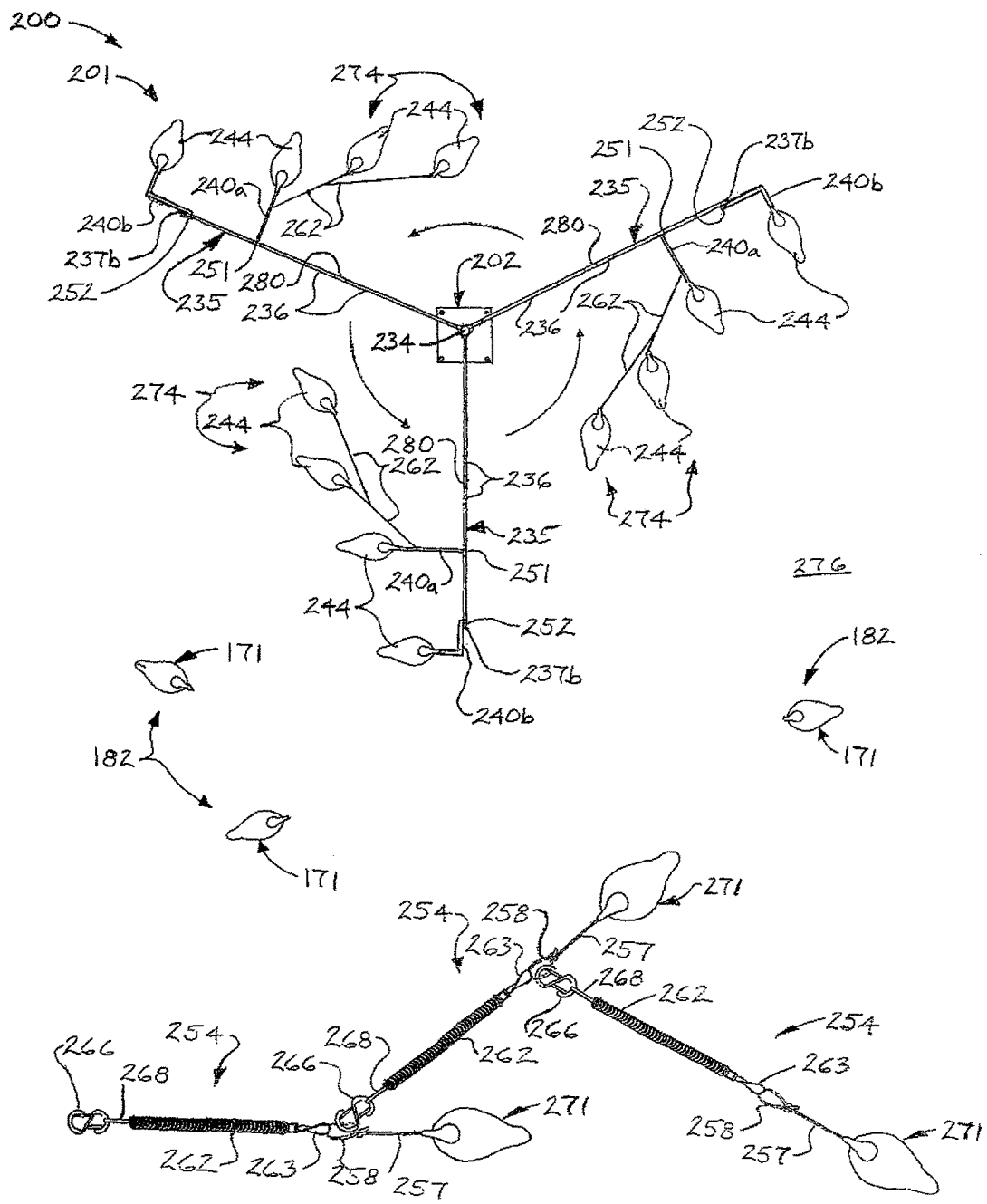
FIG. 28 is a top view of a swimming decoy system which includes the illustrative swimming decoy assembly illustrated in FIG. 25 and multiple tether line decoy assemblies illustrated in FIG. 6B in typical application of the system.

As further illustrated in FIG. 28, in some embodiments, one or more towing decoy assemblies 274 may be attached to one or more of the proximal arm branches 240a, as illustrated, and/or one or more of the distal arm branches 240b of the decoy actuating arm 235, and a fowl decoy 244 (FIG. 28) may be attached to each towing decoy assembly 274. As illustrated in FIG. 26, in some embodiments, each towing decoy assembly 274 may include a decoy attachment loop 255 made of a flexible material such as tubular rubber and a connecting member 257 which extends from the decoy attachment loop 255. A tee fitting 256, which may be flexible tubing, may attach the decoy attachment loop 255 to the connecting member 257. A tether cord 262 may be attached to the connecting member 257 at a tether loop 258, such as via a suitable first cord loop 284a secured with a first cord stay 285a. The tether cord 262 may be coiled or non-coiled. A tether hook 266 may be attached to the distal or extending end of the tether cord 262 at a second cord loop 284b secured by a second cord stay 285b.

Each towing decoy assembly 274 may be attached to the proximal arm branch 240a or to the distal arm branch 240b using the tether hook 266 (FIG. 26). As illustrated in FIG. 28, in some applications, multiple towing decoy assemblies 274 may be attached to each proximal arm branch 240a and/or to each distal arm branch 240b to form secondary, tertiary and higher-order arm branches, and fowl decoys 244 attached to the respective towing decoy assemblies 274, to provide a selected number of the fowl decoys 244 which trail behind each decoy actuating arm 235 in application of the swimming decoy assembly 201.

Application of the swimming decoy assembly 201 may be as was heretofore described with respect to the swimming decoy assembly 1 in FIGS. 1-11 and the swimming decoy assembly 101 in FIGS. 12-18. In some embodiments, the motor 14 (FIG. 5) of the swimming decoy assembly 201 may have multiple operational speeds to facilitate rotation of the arm hub 234 and decoy actuating arms 235 at various speeds, typically via control input from the RC controls 26 (FIG. 5).

As illustrated in FIG. 28, in some applications, at least one swimming decoy assembly 201 may be operated as part of a swimming decoy system 200 which may additionally include at least one tether line decoy assembly 254 that may be the same as or similar to the tether line decoy assembly 54 heretofore described with respect to FIG. 6A or the tether line decoy assembly 154 heretofore described with respect to FIG. 6B. The swimming decoy system 200 may additionally or alternatively include at least one weighted decoy assembly 182 that was heretofore described with respect to FIGS. 19 and 20. Accordingly, the fowl decoys 244 of the swimming decoy assembly 201 may simulate the straight and curved swimming paths; the fowl decoys 271 of the connected tether line decoy assemblies 254 may simulate the straight swimming paths to simulate lifelike swimming patterns of fowl; and the fowl decoy or decoys 171 of the weighted decoy assembly 182 (FIGS. 19 and 20) may simulate stationary floating of fowl on the water body 276 for the purpose of attracting fowl in hunting, observation or other applications.

While illustrative embodiments of the disclosure have been described above, it will be recognized and understood that various modifications can be made and the appended claims are intended to cover all such modifications which may fall within the spirit and scope of the disclosure.

What is claimed is:
1. A swimming decoy assembly, comprising:
a height-adjustable pedestal assembly;
an assembly housing carried by the pedestal assembly;
a motor in the assembly housing;
at least one decoy actuating arm drivingly engaged by the motor;

at least two arm branches extending from the at least one decoy actuating arm;
at least two fowl decoys attached to the at least two arm branches, respectively, each of the at least two fowl decoys having a decoy base; and
at least one towing decoy assembly attached to at least one of the at least two arm branches, the at least one towing decoy assembly includes a flexible, tubular decoy attachment loop, the decoy attachment loop is stretched, placed around a longitudinal dimension of the decoy base of at least one of the at least two fowl decoys and released to recoil around the decoy base and attach the at least one of the at least two fowl decoys to the at least one towing decoy assembly.

2. The swimming decoy assembly of claim 1 wherein the at least two arm branches comprise a flexible primary arm branch extending from the at least one decoy actuating arm and a flexible secondary arm branch extending from the at least one decoy actuating arm in spaced-apart relationship to primary arm branch.

3. The swimming decoy assembly of claim 2 wherein each of the primary arm branch and the secondary arm branch comprises flexible, elastic or resilient tubing.

4. The swimming decoy assembly of claim 1 wherein the at least one decoy actuating arm comprises a plurality of decoy actuating arms.

5. The swimming decoy assembly of claim 1 wherein the at least one towing decoy assembly comprises a tubular connecting member extending from the decoy attachment loop, a tether cord extending from the connecting member and a tether hook terminating the tether cord.

6. A swimming decoy assembly, comprising:
a height-adjustable pedestal assembly;
an assembly housing carried by the pedestal assembly;
a motor in the assembly housing;
at least one decoy actuating arm drivingly engaged by the motor;
at least two arm branches extending from the at least one decoy actuating arm;
at least two fowl decoys attached to the at least two arm branches, respectively; and
wherein the pedestal assembly comprises a pedestal assembly base, at least one pedestal stake extending from the pedestal assembly base, a pedestal leg pivotally carried by the pedestal assembly base and a housing support base pivotally carried by the pedestal leg, and wherein the assembly housing is carried by the housing support base.

7. The swimming decoy assembly of claim 6 further comprising a housing support base plate carried by the housing support base and a plurality of housing flanges carried by the assembly housing and detachably attached to the housing support base plate.

8. A swimming decoy system, comprising:
at least one swimming decoy assembly including:
a height-adjustable pedestal assembly;
an assembly housing carried by the pedestal assembly;
a motor in the assembly housing;
at least one decoy actuating arm drivingly engaged by the motor;
at least two arm branches extending from the at least one decoy actuating arm; and
at least two fowl decoys attached to the at least two arm branches, respectively, each of the at least two fowl decoys having a decoy base;
at least one towing decoy assembly attached to at least one of the at least two arm branches, the at least one towing decoy assembly includes a flexible, tubular decoy attachment loop, the decoy attachment loop of the at least one towing decoy assembly is stretched, placed around a longitudinal dimension of the decoy base of at least one of the at least two fowl decoys and released to recoil around the decoy base and attach the at least one of the at least two fowl decoys to the at least one towing decoy assembly;
at least one tether line decoy assembly in proximity to the at least one swimming decoy assembly, the at least one tether line decoy assembly including:
a decoy attachment loop;
a fowl decoy carried by the decoy attachment loop of the at least one tether line decoy assembly, the fowl decoy having a decoy base and the decoy attachment loop of the at least one tether line decoy assembly is stretched, placed around a longitudinal dimension of the decoy base of the fowl decoy and released to recoil around the decoy base of the fowl decoy and attach the fowl decoy to the at least one tether line decoy assembly;
a coiled tether cord extending from the decoy attachment loop; and
a tether hook carried by the tether cord.

9. The swimming decoy system of claim 8 wherein the at least two arm branches comprise a flexible primary arm branch extending from the at least one decoy actuating arm and a flexible secondary arm branch extending from the at least one decoy actuating arm in spaced-apart relationship to primary arm branch.

10. The swimming decoy system of claim 9 wherein each of the primary arm branch and the secondary arm branch comprises flexible, elastic or resilient tubing.

11. The swimming decoy system of claim 8 wherein the at least one decoy actuating arm comprises a plurality of decoy actuating arms.

12. The swimming decoy system of claim 8 wherein the at least one towing decoy assembly comprises a tubular connecting member extending from the decoy attachment loop of the at least one towing decoy assembly, a tether cord extending from the connecting member and a tether hook terminating the tether cord.

13. A swimming decoy system, comprising:
at least one swimming decoy assembly including:
a height-adjustable pedestal assembly;
an assembly housing carried by the pedestal assembly;
a motor in the assembly housing;
at least one decoy actuating arm drivingly engaged by the motor;
at least two arm branches extending from the at least one decoy actuating arm; and
at least two fowl decoys attached to the at least two arm branches, respectively; and
at least one tether line decoy assembly in proximity to the at least one swimming decoy assembly, the at least one tether line decoy assembly including:
a decoy attachment loop;
a fowl decoy carried by the decoy attachment loop;
a coiled tether cord extending from the decoy attachment loop;
a tether hook carried by the tether cord; and
wherein the pedestal assembly comprises a pedestal assembly base, at least one pedestal stake extending from the pedestal assembly base, a pedestal leg pivotally carried by the pedestal assembly base and a housing support base pivotally carried by the pedestal leg, and wherein the assembly housing is carried by the housing support base.

14. The swimming decoy system of claim 13 further comprising a housing support base plate carried by the housing support base and a plurality of housing flanges carried by the assembly housing and detachably attached to the housing support base plate.

15. The swimming decoy system of claim 13 further comprising at least one weighted decoy assembly in proximity to the at least one swimming decoy assembly and the at least one tether line decoy assembly, the at least one weighted decoy assembly including a decoy attachment loop, a fowl decoy carried by the decoy attachment loop, a tether cord extending from the decoy attachment loop and a weight slidably carried by the tether cord.

* * * * *